United States Patent
Van Vlassenrode et al.

(10) Patent No.: US 12,006,702 B2
(45) Date of Patent: Jun. 11, 2024

(54) FLOOR PANEL

(71) Applicant: FLOORING INDUSTRIES LIMITED, SARL, Bertrange (LU)

(72) Inventors: Kristof Van Vlassenrode, Deinze (BE); Paul Brusseel, Nazareth (BE); Nick Vanhulle, Anzegem (BE); Jochen Bossuyt, Tiegem (BE)

(73) Assignee: UNILIN BV, Wielsbeke (BE)

( * ) Notice: Subject to any disclaimer, the term of this patent is extended or adjusted under 35 U.S.C. 154(b) by 0 days.

(21) Appl. No.: 17/701,432

(22) Filed: Mar. 22, 2022

(65) Prior Publication Data
US 2022/0213695 A1 Jul. 7, 2022

Related U.S. Application Data

(63) Continuation of application No. 17/205,475, filed on Mar. 18, 2021, which is a continuation of application (Continued)

(30) Foreign Application Priority Data

Nov. 22, 2016 (BE) .................... 2016/5868

(51) Int. Cl.
*E04F 15/02* (2006.01)
*B29C 70/08* (2006.01)
(Continued)

(52) U.S. Cl.
CPC ........ *E04F 15/02038* (2013.01); *B29C 70/08* (2013.01); *B29C 70/086* (2013.01);
(Continued)

(58) Field of Classification Search
CPC . E04F 15/02038; E04F 15/105; E04F 15/107; E04F 2201/0146; E04F 2201/0153
(Continued)

(56) References Cited

U.S. PATENT DOCUMENTS 213,740 A * 4/1879 Conner .................. B61D 17/24
52/553
360,422 A 4/1887 Dougherty
(Continued)

FOREIGN PATENT DOCUMENTS

BE 1023446 A1 3/2017
BE 1024617 A1 4/2018
(Continued)

OTHER PUBLICATIONS

International Search Report in related PCT Application No. PCT/IB2017/056855, dated Feb. 26, 2018.
(Continued)

*Primary Examiner* — James M Ference
*Assistant Examiner* — Joseph J. Sadlon
(74) *Attorney, Agent, or Firm* — Workman Nydegger

(57) ABSTRACT

A floor panel with a substrate, including thermoplastic material, a decor provided thereon, and, on at least one pair of opposite edges, coupling parts realized at least partially from the substrate. The coupling parts allow a mechanical locking between two of such floor panels, where the substrate includes a rigid, non-foamed substrate layer of thermoplastic material.

22 Claims, 8 Drawing Sheets

Related U.S. Application Data

No. 16/345,855, filed as application No. PCT/IB2017/056855 on Nov. 3, 2017, now Pat. No. 10,988,939.

(60) Provisional application No. 62/420,094, filed on Nov. 10, 2016.

(51) Int. Cl.

| | |
|---|---|
| *B32B 5/02* | (2006.01) |
| *B32B 5/24* | (2006.01) |
| *B32B 27/06* | (2006.01) |
| *B32B 27/30* | (2006.01) |
| *B44C 5/04* | (2006.01) |
| *E04F 15/10* | (2006.01) |
| *B29K 27/06* | (2006.01) |
| *B29K 105/04* | (2006.01) |
| *B29K 309/08* | (2006.01) |
| *B29L 31/00* | (2006.01) |
| *B32B 5/16* | (2006.01) |
| *B32B 5/18* | (2006.01) |

(52) U.S. Cl.
CPC ............. *B32B 5/022* (2013.01); *B32B 5/024* (2013.01); *B32B 5/245* (2013.01); *B32B 27/065* (2013.01); *B32B 27/304* (2013.01); *B44C 5/0407* (2013.01); *E04F 15/105* (2013.01); *E04F 15/107* (2013.01); *B29K 2027/06* (2013.01); *B29K 2105/04* (2013.01); *B29K 2309/08* (2013.01); *B29L 2031/732* (2013.01); *B32B 5/02* (2013.01); *B32B 5/16* (2013.01); *B32B 5/18* (2013.01); *B32B 27/30* (2013.01); *B32B 2262/101* (2013.01); *B32B 2264/0242* (2013.01); *B32B 2266/0235* (2013.01); *B32B 2419/04* (2013.01); *B32B 2471/00* (2013.01); *E04F 2201/0146* (2013.01); *E04F 2201/0153* (2013.01); *E04F 2201/0552* (2013.01); *E04F 2290/042* (2013.01)

(58) Field of Classification Search
USPC ........................................................ 52/588.1
See application file for complete search history.

(56) References Cited

U.S. PATENT DOCUMENTS

| | | |
|---|---|---|
| 1,615,096 A | 1/1927 | Meyers |
| 1,778,069 A | 10/1930 | Fetz |
| 1,943,663 A | 1/1934 | Ericson |
| 2,269,926 A | 1/1942 | Crooks |
| 2,694,025 A | 11/1954 | Slayter et al. |
| 2,811,906 A | 11/1957 | Chappell |
| 2,944,622 A | 7/1960 | Dobbins |
| 3,139,371 A | 6/1964 | Sisko |
| 3,215,225 A | 11/1965 | Kirschner |
| 3,230,375 A | 1/1966 | Wagoner |
| 3,284,980 A | 11/1966 | Dinkel |
| 3,360,422 A | 12/1967 | Desch |
| 3,616,112 A | 10/1971 | Desai |
| 3,694,983 A | 10/1972 | Couquet |
| 3,712,846 A | 1/1973 | Daniels |
| 3,720,027 A * | 3/1973 | Christensen ............. E04C 2/243 52/591.1 |
| 3,806,567 A | 4/1974 | Graham, Jr. et al. |
| 3,888,061 A * | 6/1975 | Kahr .......................... B32B 3/06 156/182 |
| 3,936,391 A | 2/1976 | Gabby et al. |
| 3,988,098 A | 10/1976 | Kato et al. |
| 4,018,957 A | 4/1977 | Werner |
| 4,068,030 A | 1/1978 | Witman |
| 4,195,713 A | 4/1980 | Hagbjer et al. |
| 4,230,521 A | 10/1980 | Cobb et al. |
| 4,283,457 A | 8/1981 | Kolsky et al. |
| 4,292,364 A | 9/1981 | Wesch et al. |
| 4,317,860 A | 3/1982 | Strassel |
| 4,504,538 A | 3/1985 | Mussallem, Jr. |
| 4,546,024 A | 10/1985 | Brown |
| 4,710,415 A | 12/1987 | Slosberg |
| 5,059,474 A | 10/1991 | Yoshida |
| 5,073,425 A * | 12/1991 | Dees, Jr. ................. B32B 27/18 428/48 |
| 5,271,200 A | 12/1993 | Witt |
| 5,318,832 A | 6/1994 | Fishel et al. |
| 5,344,704 A | 9/1994 | O'Dell et al. |
| 5,501,895 A * | 3/1996 | Finley ....................... B32B 7/12 428/308.4 |
| 5,506,031 A | 4/1996 | Spain et al. |
| 5,512,233 A | 4/1996 | Gallagher et al. |
| 5,589,243 A | 12/1996 | Day |
| 5,604,025 A | 2/1997 | Tesch |
| 5,643,677 A | 7/1997 | Feifer et al. |
| 5,674,586 A | 10/1997 | Toni et al. |
| 5,705,250 A | 1/1998 | Hudson, Jr. |
| 5,755,068 A * | 5/1998 | Ormiston .......... E04F 15/02033 428/167 |
| 5,776,582 A | 7/1998 | Needham |
| 5,780,147 A | 7/1998 | Sugahara et al. |
| 5,830,549 A | 11/1998 | Sweet |
| 5,836,128 A * | 11/1998 | Groh ....................... E04F 15/10 52/775 |
| 5,925,211 A | 7/1999 | Rakauskas |
| 6,006,486 A | 12/1999 | Moriau et al. |
| 6,182,413 B1 * | 2/2001 | Magnusson ........... E04F 15/022 52/592.1 |
| 6,209,278 B1 * | 4/2001 | Tychsen .................. B29C 48/07 52/592.4 |
| 6,271,156 B1 | 8/2001 | Gleason |
| 6,324,809 B1 * | 12/2001 | Nelson ..................... E04F 15/02 52/592.2 |
| 6,344,268 B1 | 2/2002 | Stucky et al. |
| 6,345,481 B1 | 2/2002 | Nelson |
| 6,438,919 B1 * | 8/2002 | Knauseder ............... E04F 15/04 52/592.4 |
| 6,440,538 B1 | 8/2002 | Ungar |
| 6,536,178 B1 * | 3/2003 | Pålsson et al. ......... B44C 3/123 52/392 |
| 6,601,359 B2 | 8/2003 | Olofsson |
| 6,672,030 B2 * | 1/2004 | Schulte ................... E04F 15/02 52/592.4 |
| 6,673,177 B2 | 1/2004 | Buckwalter et al. |
| 6,715,239 B2 | 4/2004 | Passalacqua |
| 6,766,622 B1 * | 7/2004 | Thiers ..................... E04F 15/04 144/380 |
| 6,767,630 B2 | 7/2004 | Okuyama |
| 6,790,525 B2 | 9/2004 | Takeuchi et al. |
| 6,818,282 B2 * | 11/2004 | Hynicka .................. B32B 27/12 428/196 |
| 6,824,851 B1 | 11/2004 | Locher et al. |
| 6,855,221 B1 | 2/2005 | Lepsius et al. |
| 6,933,043 B1 * | 8/2005 | Son ........................ B32B 5/022 428/420 |
| 6,972,153 B2 | 12/2005 | Muller et al. |
| 7,124,549 B2 | 10/2006 | Weber |
| 7,243,469 B2 * | 7/2007 | Miller ..................... B32B 21/02 52/311.1 |
| 7,386,963 B2 | 6/2008 | Pervan |
| 7,449,231 B2 | 11/2008 | Kang |
| 7,504,159 B1 | 3/2009 | Suare et al. |
| 7,596,920 B2 | 10/2009 | Konstanczak |
| 7,726,088 B2 | 6/2010 | Muehlebach |
| 7,762,036 B2 | 7/2010 | Li et al. |
| 7,802,415 B2 | 9/2010 | Pervan |
| 7,849,648 B2 | 12/2010 | Tonyan et al. |
| 7,892,617 B2 | 2/2011 | Bathelier et al. |
| 7,896,571 B1 | 3/2011 | Hannig et al. |
| 8,069,633 B2 | 12/2011 | Tonyan et al. |
| 8,092,865 B2 | 1/2012 | Oldorff et al. |
| 8,173,238 B2 | 5/2012 | Okano et al. |

(56) References Cited

U.S. PATENT DOCUMENTS

| | | |
|---|---|---|
| 8,205,404 B2 | 6/2012 | Vermeulen et al. |
| 8,221,663 B2* | 7/2012 | Michalik ............... B29C 48/07 |
| | | 264/176.1 |
| 8,234,829 B2 | 8/2012 | Thiers et al. |
| 8,245,477 B2 | 8/2012 | Pervan |
| 8,431,054 B2 | 4/2013 | Pervan et al. |
| 8,495,849 B2 | 7/2013 | Pervan |
| 8,495,851 B2 | 7/2013 | Surace |
| 8,544,232 B2 | 10/2013 | Wybo et al. |
| 8,549,807 B2* | 10/2013 | Meersseman ......... E04F 15/107 |
| | | 52/DIG. 9 |
| 8,631,622 B2 | 1/2014 | Baert et al. |
| 8,640,824 B2 | 2/2014 | Freedman |
| 8,689,513 B2 | 4/2014 | Windmoller |
| 8,726,603 B2 | 5/2014 | Huang |
| 8,728,603 B2 | 5/2014 | Windmoller |
| 8,806,830 B2 | 8/2014 | Schacht et al. |
| 8,820,014 B2 | 9/2014 | Durnberger |
| 8,859,085 B2 | 10/2014 | Hahn et al. |
| 8,925,275 B2 | 1/2015 | Meersseman et al. |
| 8,950,148 B2 | 2/2015 | De Boe |
| 9,133,626 B2 | 9/2015 | Song |
| 9,140,010 B2 | 9/2015 | Pervan |
| 9,156,233 B2 | 10/2015 | Dossche et al. |
| 9,212,493 B2 | 12/2015 | Cappelle et al. |
| 9,217,251 B2 | 12/2015 | D'Agostino |
| 9,249,582 B1 | 2/2016 | Anspach et al. |
| 9,295,748 B2 | 3/2016 | Joseph |
| 9,322,184 B2 | 4/2016 | Meersseman et al. |
| 9,399,308 B2 | 7/2016 | Fridlund |
| 9,409,382 B2 | 8/2016 | Hakansson et al. |
| 9,527,975 B2 | 12/2016 | Fang |
| 9,528,278 B2* | 12/2016 | Cappelle ............ E04F 15/02033 |
| 9,567,755 B2 | 2/2017 | Ramachandra |
| 9,573,343 B2 | 2/2017 | Pervan |
| 9,593,493 B2 | 3/2017 | Grandados |
| 9,598,866 B2 | 3/2017 | Doehring |
| 9,611,659 B2 | 4/2017 | Baert |
| 9,624,678 B2 | 4/2017 | Segaert et al. |
| 9,636,889 B2 | 5/2017 | Pawlak |
| 9,650,792 B2 | 5/2017 | Ramachandra |
| 9,677,284 B1 | 6/2017 | Barrett |
| 9,695,600 B2 | 7/2017 | Vandevoorde |
| 9,744,753 B2 | 8/2017 | Sheffield |
| 9,745,758 B2 | 8/2017 | Baert et al. |
| 9,758,973 B2 | 9/2017 | Segaert |
| 9,771,721 B2* | 9/2017 | Cappelle ............... B32B 27/304 |
| 9,783,996 B2 | 10/2017 | Pervan et al. |
| 9,803,374 B2 | 10/2017 | Pervan |
| 9,833,974 B2 | 12/2017 | Kwon |
| 9,874,028 B2 | 1/2018 | Boucke et al. |
| 10,059,084 B2 | 8/2018 | Lundblad et al. |
| 10,066,401 B2 | 9/2018 | Segaert et al. |
| 10,072,428 B2 | 9/2018 | Devos |
| 10,094,124 B2 | 10/2018 | Chen |
| 10,189,236 B2 | 1/2019 | Lautzenhiser |
| 10,214,918 B2 | 2/2019 | Cappelle |
| 10,220,599 B2 | 3/2019 | Troendle et al. |
| 10,233,656 B2 | 3/2019 | Courey et al. |
| 10,265,929 B2 | 4/2019 | Lee et al. |
| 10,266,303 B1 | 4/2019 | Kownacki et al. |
| 10,309,113 B2 | 6/2019 | Devos |
| 10,343,381 B2 | 7/2019 | Troendle |
| 10,392,813 B2* | 8/2019 | Lombaert ............. E04F 15/107 |
| 10,422,131 B2 | 9/2019 | Imbeau et al. |
| 10,465,390 B2 | 11/2019 | Bladh et al. |
| 10,472,833 B2 | 11/2019 | Loncke et al. |
| 10,480,201 B2 | 11/2019 | Segaert et al. |
| 10,544,595 B2 | 1/2020 | Courey |
| 10,562,282 B2* | 2/2020 | Toft ....................... B32B 27/40 |
| 10,612,249 B2 | 4/2020 | Cappelle |
| 10,619,357 B2 | 4/2020 | Segaert et al. |
| 10,655,338 B2 | 5/2020 | D'Hondt et al. |
| 10,753,102 B2 | 8/2020 | Van Giel et al. |
| 10,774,541 B2 | 9/2020 | Zhang et al. |
| 10,774,543 B2 | 9/2020 | Segaert et al. |
| 10,961,722 B2 | 3/2021 | Baert et al. |
| 10,974,488 B2 | 4/2021 | Chen et al. |
| 10,988,939 B2 | 4/2021 | Van Vlassenrode et al. |
| 11,149,446 B2 | 10/2021 | Baert et al. |
| 11,299,893 B2 | 4/2022 | Segaert et al. |
| 11,400,617 B2 | 8/2022 | Zhang et al. |
| 11,505,949 B2 | 11/2022 | Meersseman et al. |
| 2001/0021431 A1 | 9/2001 | Chen et al. |
| 2002/0189183 A1* | 12/2002 | Ricciardelli ............ B32B 27/06 |
| | | 52/311.1 |
| 2003/0077433 A1 | 4/2003 | Dohring |
| 2003/0154676 A1* | 8/2003 | Schwartz .......... E04F 15/02138 |
| | | 52/592.1 |
| 2003/0203152 A1 | 10/2003 | Higgins et al. |
| 2003/0233809 A1* | 12/2003 | Pervan .............. E04F 15/02033 |
| | | 52/592.1 |
| 2004/0013891 A1 | 1/2004 | Mueller et al. |
| 2004/0255538 A1 | 12/2004 | Ruhdorfer |
| 2005/0136276 A1 | 6/2005 | Borup et al. |
| 2006/0024465 A1 | 2/2006 | Briere |
| 2006/0099405 A1 | 5/2006 | Guiselin |
| 2006/0144005 A1 | 7/2006 | Tonyan et al. |
| 2006/0236642 A1 | 10/2006 | Pervan |
| 2008/0000188 A1 | 1/2008 | Pervan |
| 2009/0183457 A1 | 7/2009 | Boucke |
| 2009/0226662 A1 | 9/2009 | Dyczko-Riglin et al. |
| 2010/0300030 A1 | 12/2010 | Pervan et al. |
| 2010/0326011 A1 | 12/2010 | Norling |
| 2011/0056159 A1 | 3/2011 | Tonyan et al. |
| 2012/0128946 A1 | 3/2012 | Kwon et al. |
| 2012/0128967 A1 | 5/2012 | Belcher, Jr. et al. |
| 2013/0067842 A1 | 3/2013 | Meersseman et al. |
| 2013/0266759 A1 | 10/2013 | Kim et al. |
| 2015/0110988 A1 | 4/2015 | Peavey et al. |
| 2015/0121793 A1 | 5/2015 | Segaert et al. |
| 2015/0167319 A1 | 6/2015 | Segaert et al. |
| 2015/0337540 A1 | 11/2015 | Cappelle |
| 2016/0046108 A1* | 2/2016 | Tamura ................. B32B 15/098 |
| | | 156/60 |
| 2016/0129299 A1 | 5/2016 | Newman |
| 2016/0130821 A1 | 5/2016 | Sorano |
| 2016/0144606 A1 | 5/2016 | Van Vlassenrode et al. |
| 2016/0194885 A1 | 7/2016 | Whispell et al. |
| 2016/0250835 A1 | 9/2016 | Pervan |
| 2016/0288447 A1 | 10/2016 | Cordeiro |
| 2017/0087781 A1 | 3/2017 | Segaert et al. |
| 2017/0136674 A1 | 5/2017 | Chen et al. |
| 2017/0183878 A1 | 6/2017 | Zhang et al. |
| 2017/0335573 A1 | 11/2017 | Segaert et al. |
| 2018/0030737 A1 | 2/2018 | Pervan |
| 2018/0038115 A1 | 2/2018 | Cappelle |
| 2018/0209155 A1 | 7/2018 | Segaert et al. |
| 2019/0003189 A1 | 1/2019 | Dohring |
| 2019/0032342 A1 | 1/2019 | Segaert |
| 2019/0153734 A1 | 5/2019 | Van Vlassenrode et al. |
| 2019/0177984 A1 | 6/2019 | Cappelle |
| 2019/0218794 A1 | 7/2019 | Segaert et al. |
| 2019/0283272 A1 | 9/2019 | Zhang et al. |
| 2020/0199892 A1 | 6/2020 | Segaert et al. |
| 2020/0370309 A1 | 11/2020 | Segaert et al. |
| 2022/0162862 A1 | 5/2022 | Segaert et al. |
| 2023/0151618 A1 | 5/2023 | Meersseman et al. |

FOREIGN PATENT DOCUMENTS

| | | |
|---|---|---|
| CA | 2920012 A1 | 1/2012 |
| CA | 2984309 C | 12/2019 |
| CN | 101045350 A | 10/2007 |
| CN | 101084125 A | 12/2007 |
| CN | 101111651 A | 1/2008 |
| CN | 102933385 A | 2/2013 |
| CN | 103072346 A | 5/2013 |
| CN | 103403280 A | 11/2013 |
| CN | 103492175 A | 1/2014 |
| CN | 104005538 A | 8/2014 |
| CN | 104160101 A | 11/2014 |
| CN | 104619936 A | 5/2015 |

(56) References Cited

FOREIGN PATENT DOCUMENTS

| | | |
|---|---|---|
| CN | 105908946 B | 7/2018 |
| DE | 102005021662 A1 | 11/2006 |
| DE | 102014108885 A1 | 9/2015 |
| EP | 1075938 A1 | 2/2001 |
| EP | 2223800 A1 | 9/2010 |
| EP | 2402155 A1 | 1/2012 |
| EP | 2447063 A1 | 5/2012 |
| EP | 2447064 A1 | 5/2012 |
| EP | 2636524 A1 | 9/2013 |
| EP | 3351703 A1 | 7/2018 |
| JP | S62160211 A | 7/1987 |
| KR | 20110032536 A | 3/2011 |
| KR | 20150022915 A | 3/2015 |
| KR | 101626470 B1 | 6/2016 |
| RU | 2270759 C2 | 2/2006 |
| WO | 0247906 A1 | 6/2002 |
| WO | 2006043893 A1 | 4/2006 |
| WO | 2006052845 A2 | 5/2006 |
| WO | 2006126930 A1 | 11/2006 |
| WO | 2007141605 A2 | 12/2007 |
| WO | 2008068245 A1 | 6/2008 |
| WO | 2009066153 A2 | 5/2009 |
| WO | 2011085306 A1 | 7/2011 |
| WO | 2011141849 A2 | 11/2011 |
| WO | 2012001109 A1 | 1/2012 |
| WO | 2012004701 A1 | 1/2012 |
| WO | 2013026559 A2 | 2/2013 |
| WO | 2013179261 A1 | 12/2013 |
| WO | 2014006593 A1 | 1/2014 |
| WO | 2015170274 A1 | 11/2015 |
| WO | 2016001859 A1 | 1/2016 |
| WO | 2016016864 A1 | 2/2016 |
| WO | 2016079225 A1 | 5/2016 |
| WO | 2016113377 | 7/2016 |
| WO | 2017049795 A1 | 3/2017 |
| WO | 2017087725 A1 | 5/2017 |
| WO | 2017133804 A1 | 8/2017 |
| WO | 2018004724 A1 | 1/2018 |
| WO | 2018004725 A1 | 1/2018 |
| WO | 2018007932 A2 | 1/2018 |
| WO | 2018073645 A2 | 4/2018 |
| WO | 2018098899 A1 | 6/2018 |

OTHER PUBLICATIONS

Written Opinion in related PCT Application No. PCT/IB2017/056855, dated Feb. 26, 2018.
Belgium Search Report in related BE Application No. 201605868 dated Jun. 28, 2017.

* cited by examiner

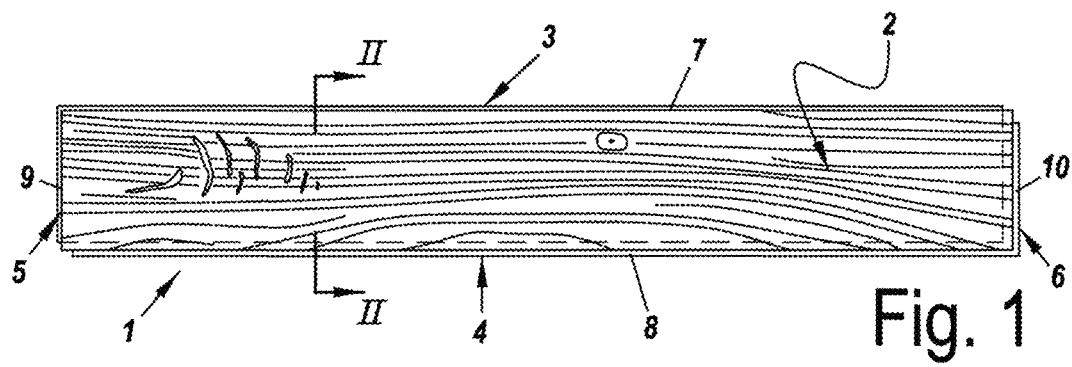
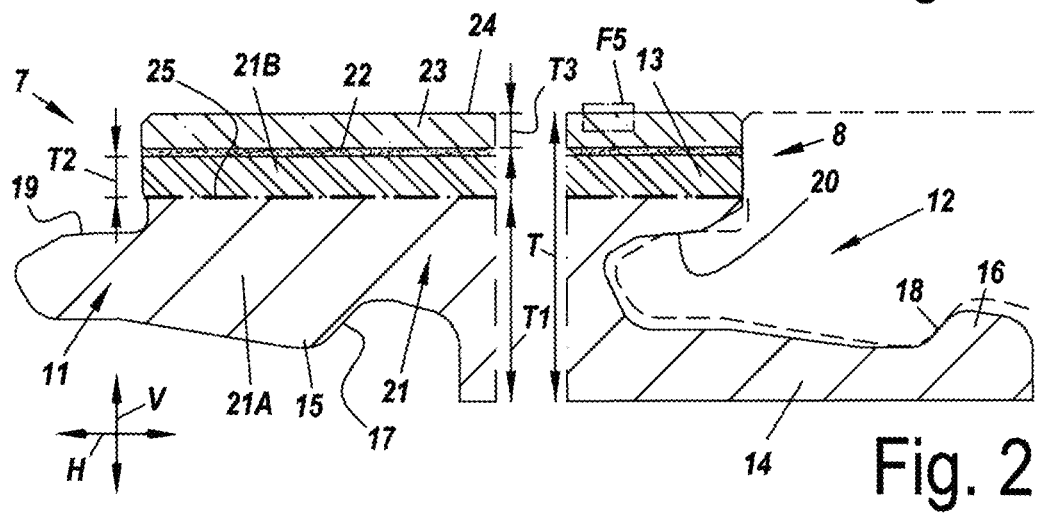
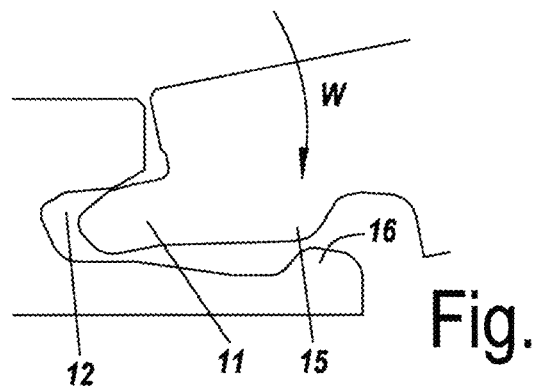
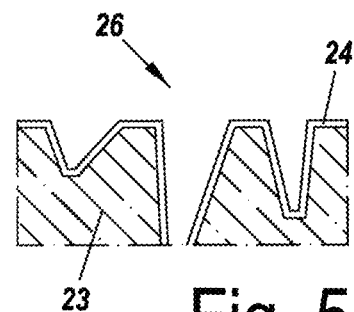
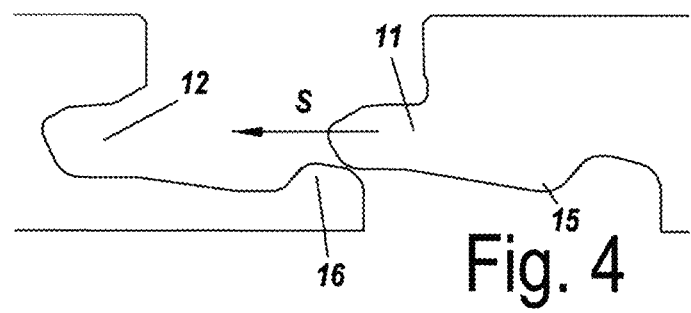

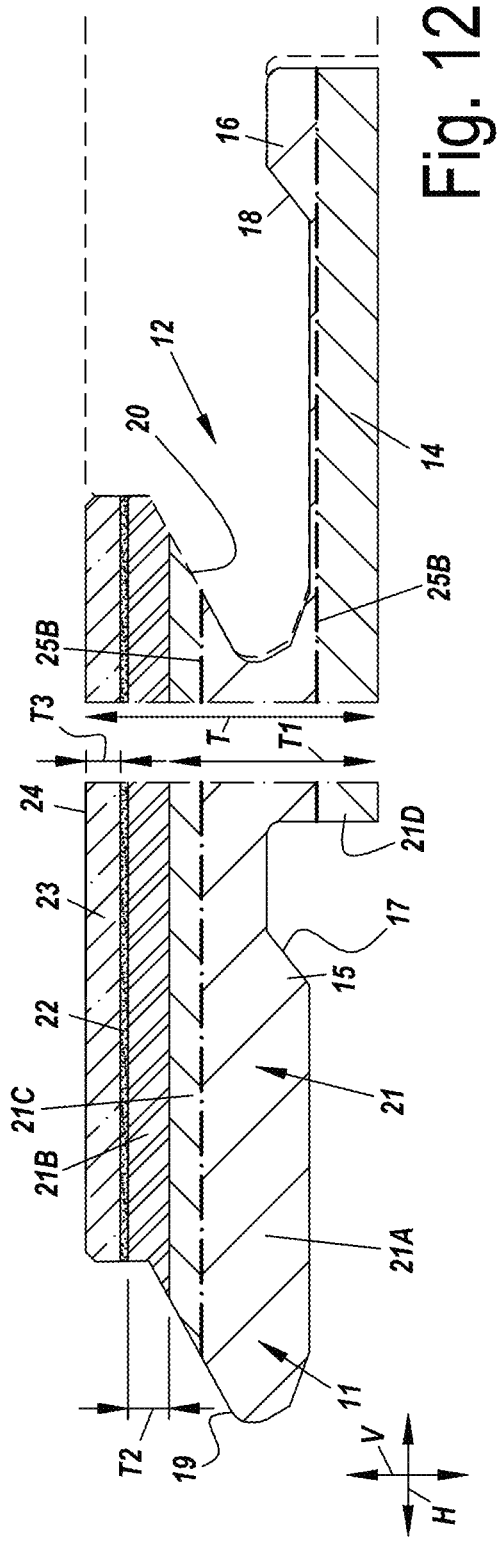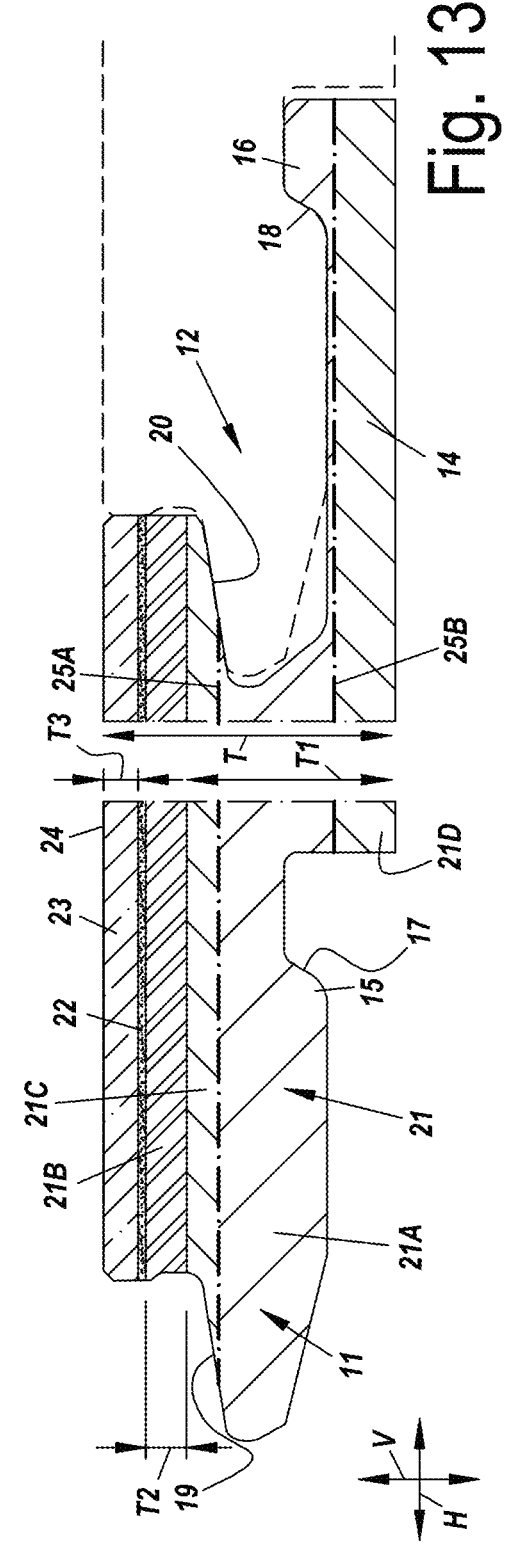

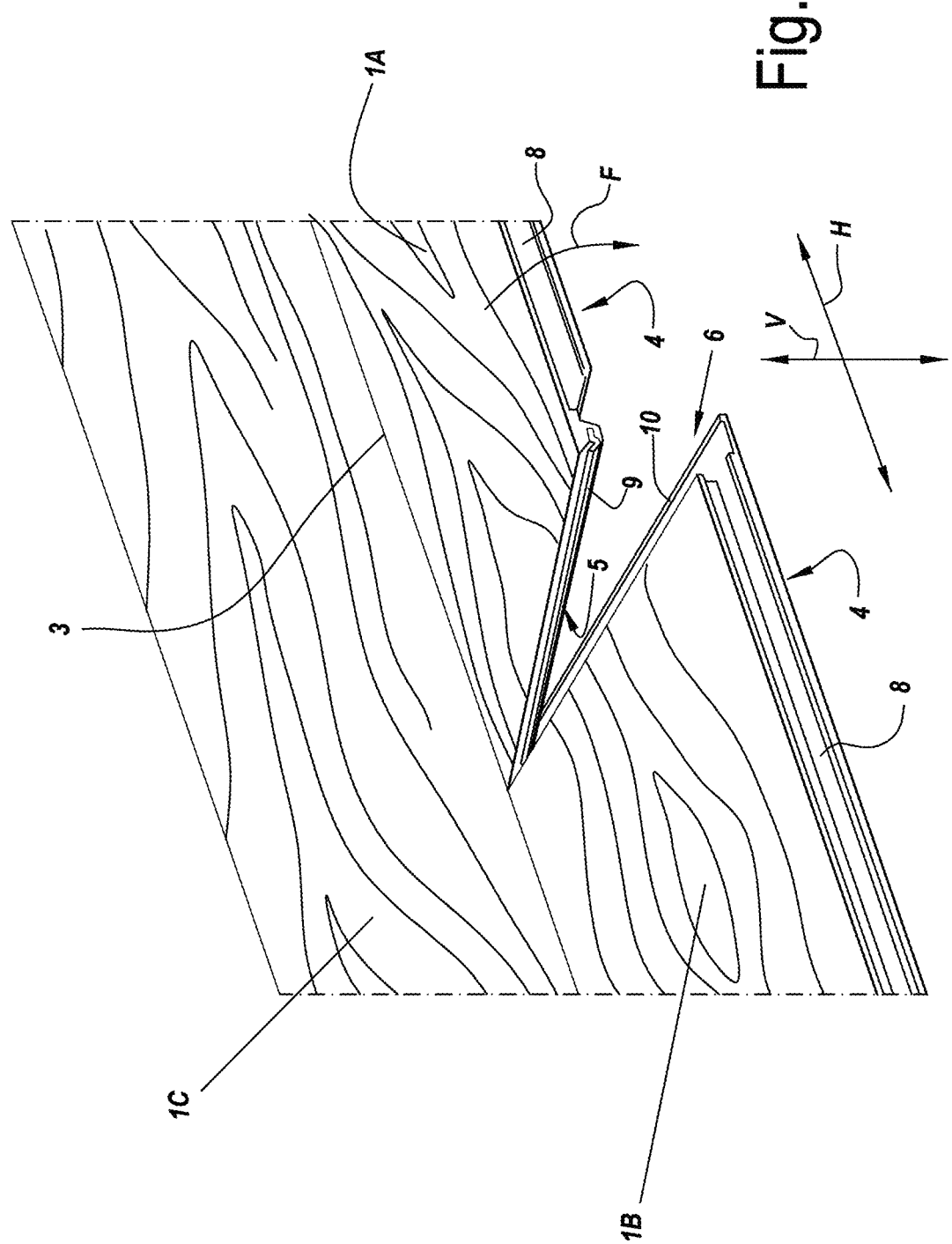

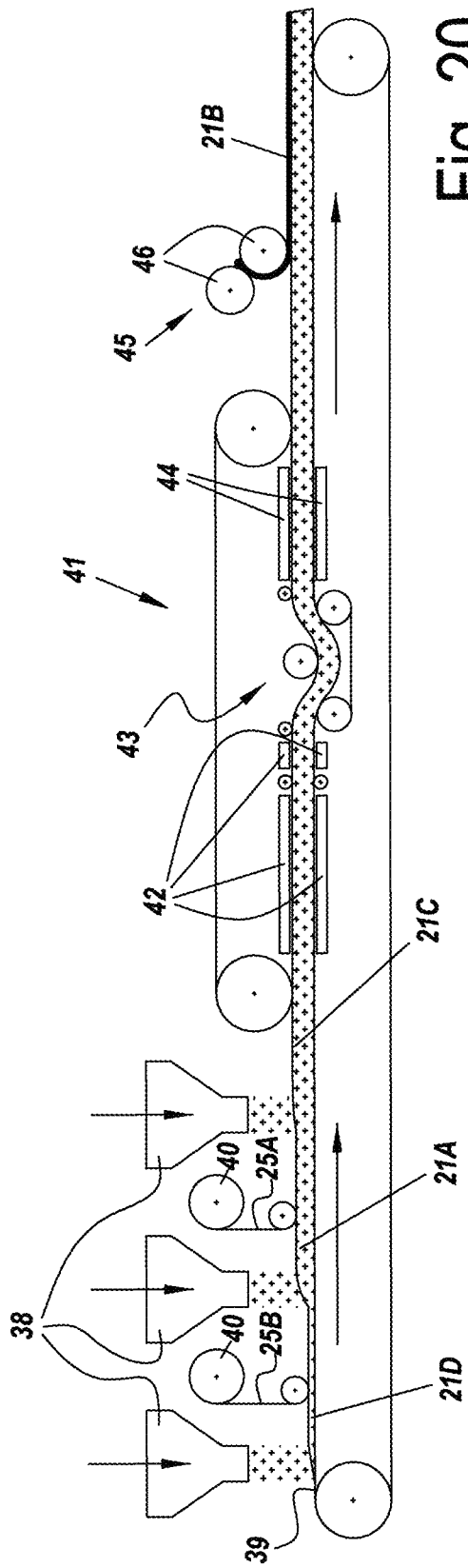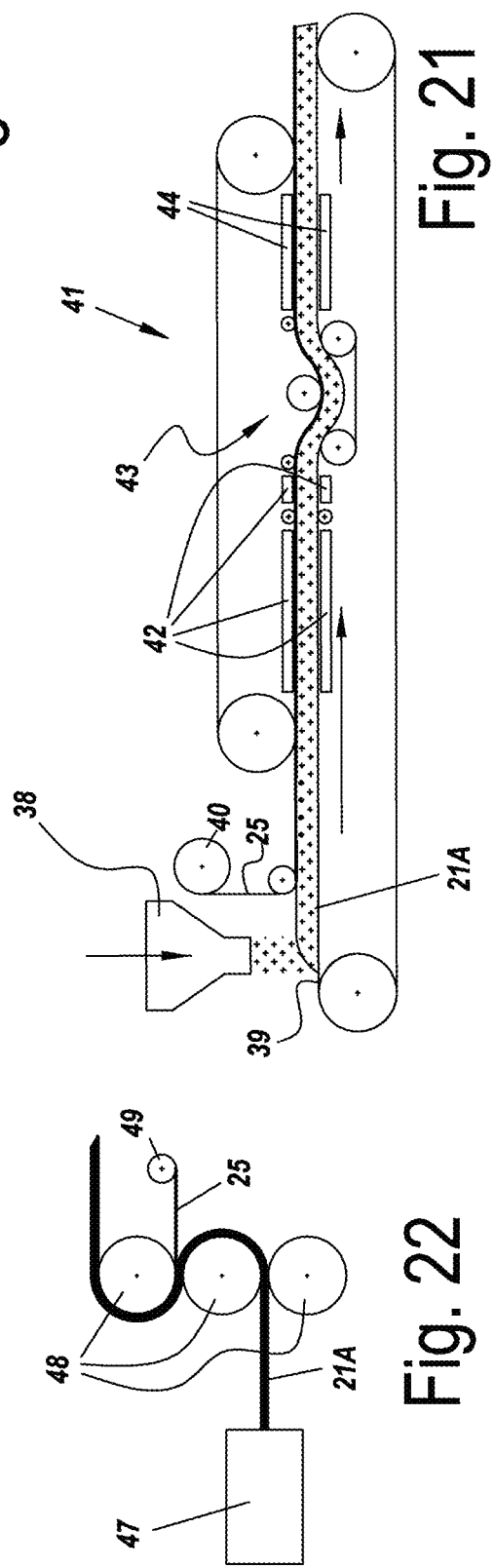

FLOOR PANEL

CROSS REFERENCE TO RELATED APPLICATIONS

This application is a continuation application of U.S. application Ser. No. 17/205,475, filed Mar. 18, 2021, which is a continuation of U.S. application Ser. No. 16/345,855, filed Apr. 29, 2019, now U.S. Pat. No. 10,988,939, which is the national stage filing of international application PCT/M2017/056855, filed Nov. 3, 2017, which claims the benefit under 35 U.S.C. 119(e) to the U.S. provisional application 62/420,094 filed on Nov. 10, 2016 and Belgium application BE 2016/5868, filed Nov. 22, 2016, which are incorporated herein by reference.

This invention relates to a floor panel and to a method for manufacturing a floor panel. More particularly, the invention relates to a floor panel of the type which comprises a substrate comprising thermoplastic material, and a decor provided thereon, as well as, on at least one pair of opposite edges, coupling parts realized at least partially from the substrate, said coupling parts allowing to effect a mechanical locking, i.e. without using glue or the like, between two of such floor panels. This type of floor panels allows forming a waterproof floor covering in a smooth and user-friendly manner. Such floor covering may also be applied without any problems in humid rooms, such as bathrooms, contrary to wood-based laminate floor panels with, for example, a MDF or HOF substrate, which are less suitable for such applications.

BACKGROUND OF THE INVENTION

Document WO 2013/026559 describes such floor panel, wherein the substrate comprises one or more substrate layers of soft or flexible polyvinyl chloride, abbreviated PVC. However, such floor panel entrains a number of problems. For example, there is a not to be neglected risk of telegraphy effects. Herein, after a certain period of time imperfections in the underlying surface or subfloor on which the panels are installed will 30 become visible on the surface of the panels. When installing the panels in a room with much incident sunlight, such as a veranda or the like, there is also a high risk of the occurrence of pushed-up edges and/or the formation of gaps between the mutually coupled panels. This is the result of the expansion/shrinkage the substrate is undergoing with varying temperatures. Although the use of a glass fiber layer may increase the dimensional stability of the floor panel, this often still has proven insufficient in order to avoid the last-mentioned problems. Moreover, the panels are relatively flexible and bendable, due to which the installation thereof cannot always performed equally smooth. Moreover, the lacquer layer present on the upper side of the panel mostly scores insufficient in the field of wear resistance, scratch resistance, stain resistance and the like.

The floor panel which is known from document WO 2014/006593 already tackles a number of the mentioned problems. It has a rigid substrate layer formed by means of extrusion, which comprises, on the one hand, high-density polyethylene, abbreviated HOPE, or PVC and, on the other hand, powder of bamboo, wood and/or cork. This substrate layer is glued together with a veneer layer, such as a decorative vinyl layer. This floor panel already offers a considerably higher resistance against telegraphy effects. Due to the rigidity thereof, it is also easier to install. However, it also has disadvantages. So, the flatness of the floor panel cannot be guaranteed. There is a considerable risk that it will warp. Moreover, the floor panel seems to be sensitive for the forming of indentations in the upper side thereof, for example, when table or chair legs are standing thereupon. Further, delamination problems may occur, wherein the veneer layer becomes detached from the substrate layer.

SUMMARY OF THE INVENTION

The invention has the aim of offering a solution to one or more of the aforementioned and/or other problems.

To this aim, the invention, according to a first independent aspect thereof, relates to a floor panel of the aforementioned type, with the characteristic that the substrate comprises a rigid substrate layer of thermoplastic material and a glass fiber layer is present in the floor panel. The inventor has found that applying a glass fiber layer with a rigid substrate layer is extremely advantageous. It provides for a reduced risk of warping of the panels. Moreover, there is a less high risk of pushed-up edges and/or gap formation when installing the panels in a veranda or the like. The expansion/shrink is still there, however, this seems to lead less to the last-mentioned disadvantageous effects. Herein, it is noted that the expansion as such does not pose a problem, as this can be counteracted by providing the necessary expansion spaces.

It is noted that by the term substrate reference is made to that portion of the floor panel which is situated underneath the decor or the possible decor carrier.

The rigidity of the substrate layer preferably is obtained by making the thermoplastic material thereof rigid. This is possibly by using an appropriate amount of plasticizer or no plasticizers at all. If plasticizers are used, this preferably is in an amount of less than 15 phr, less than 10 phr or less than 5 phr. It is noted that an amount of plasticizers of less than 15 phr means that per 100 parts of thermoplastic synthetic material less than 15 parts of plasticizers are present. Examples of plasticizers which can be applied are phthalate-based plasticizers, such as di-isononyl phthalate, abbreviated DINP, or dioctyl phthalate, abbreviated DOP or DnOP, or, as an alternative for phthalate-based plasticizers, di-octyl terephthalate, abbreviated DOTP, or di-isononyl-1, 2-cyclohexane dicarboxylate, abbreviated DINCH.

The thermoplastic material of the rigid substrate layer preferably comprises one or more of the following thermoplastic synthetic materials: PVC, polyethylene, HOPE, polypropylene, polyester, polyethylene terephthalate, abbreviated PET, polyurethane and/or elastomer. The most preferred synthetic material is PVC.

The thermoplastic material of the rigid substrate layer preferably comprises an amount of filler. Fillers promote the stiffness of the panels. Various kinds of fillers may be applied, whether or not in combination:
- an inorganic filler, such as chalk, lime and/or talc;
- an organic filler, such as wood, bamboo and/or cork; and/or
- a mineral filler.

It is also noted that the filler talc is particularly advantageous. Namely, it has shown that this filler has a positive effect on the dimensional stability of the panel.

The percentage of filler preferably is situated between 30 and 70 percent by weight or between 45 and 65 percent by weight. Herein, it is noted that the percentage by weight is considered in respect to the total weight of thermoplastic material in the substrate layer.

The proportion of filler preferably is at least 40 percent by weight, more preferably at least 50 percent by weight and still more preferably at least 60 or at least 70 percent by weight. It has shown that such rather high proportion of filler increases the dimensional stability of the substrate layer.

The thermoplastic material of the rigid substrate layer may comprise an impact modifier, a stabilizer, such as a Ca/Zn stabilizer, and/or a color pigment, such as carbon black.

It is also noted that the thermoplastic material of the substrate layer may or may not be recycled material.

Preferably, the rigid substrate layer is not or almost not foamed. The inventor has found that such substrate layer does not only offer a better resistance against telegraphy effects than foamed layers, but also against indentation. It is also noted that almost not foamed means that the density of the unfoamed thermoplastic material by foaming is reduced by maximum 10% and preferably by maximum 5% or by maximum 2%. The density of the not or almost not foamed substrate layer preferably is situated between 1300 and 2000 kg per cubic meter or between 1500 and 2000 kg per cubic meter.

However, it is not excluded that the rigid substrate layer is foamed. In fact, the inventor has found that foaming has a positive influence on the dimensional stability. Preferably, the density reduction is more than 10%. This means that the density of the unfoamed thermoplastic material is reduced by more than 10% by foaming.

The rigid substrate layer can be formed by means of various techniques, such as strewing, extrusion or calendering processes. The strewing process, which as such is known from documents WO 2013/179261 and BE 2015/5572, is preferred. In fact, the flatness of the substrate layer can be guaranteed better by such process.

The glass fiber layer may relate, for example, to a glass fiber fleece, a glass fiber cloth or a glass fiber net.

The glass fiber layer preferably adjoins the rigid substrate layer. In this position, the glass fiber layer may best counteract the possible warping or dimensional deformation of the substrate layer.

The glass fiber layer preferably is at least partially impregnated with a thermoplastic material of the rigid substrate layer. This provides for a good embedding of the glass fiber layer, due to which the working thereof is more effective. The risk of delamination is reduced as well.

It is also noted that the glass fiber layer preferably relates to a glass fiber fleece. Such type of glass fiber layer is bonding better to the substrate layer. A better impregnation is possible as well.

The substrate may comprise a second rigid substrate layer of thermoplastic material.

This substrate layer may show one or more of the characteristics of the first-mentioned substrate layer.

Preferably, the glass fiber layer is adjacent to the first-mentioned as well as to the second substrate layer. Herein, the glass fiber layer is situated between the two substrate layers. This can be obtained in different manners.

It is preferred that the two rigid substrate layers are provided by means of a strewing treatment. In this case, the one substrate layer can be strewn, the glass fiber layer can be provided thereon, and the other substrate layer can be strewn on this complex. Subsequently, the whole can be consolidated. Such process is known as such from document WO 2013/179261. It offers the advantage that the glass fiber layer can be embedded very well between the two substrate layers.

Another possibility is the one wherein the one substrate layer is provided by means of a strewing treatment, the glass fiber layer is provided thereon, this complex is consolidated and the other substrate layer only then is provided on this consolidated complex. Such process is known from document WO 2016/079225. It offers the advantage that the risk of deformation and/or damage of the glass fiber layer can be minimized, as a press element of the possibly employed press device can be directly brought into direct with the glass fiber layer. The other substrate layer may be provided, for example, by means of a calendering technique.

Still another possibility is manufacturing the two rigid substrate layers by means of extrusion. In that case, the extruded substrate layers and the glass fiber layer can be stacked on top of each other and subsequently can be bonded to each other. The mutual bonding can be performed in a press device, for example, in a single-daylight or multi-daylight press.

Another option is forming the one substrate layer by means of extrusion, transporting this extruded substrate layer and providing the glass fiber layer during said transport on said extruded substrate layer. An advantage of this process in respect to the preceding one is that it can be performed continuously. For example, the one substrate layer can be transported along guide rollers and the glass fiber layer can be supplied along with the substrate layer between these guide rollers. The other substrate layer can be provided afterwards on the glass fiber layer. Or it is possible to provide this substrate layer together with the glass fiber layer on the one substrate layer during the transport thereof.

The glass fiber layer can be untreated. However, it is also possible that the glass fiber layer is pretreated. This latter may provide for a better connection with the substrate layer or layers to which the glass fiber layer is adjacent. The pretreatment can include that a coating is provided on the glass fiber layer or that the glass fiber layer is impregnated. The coating or the impregnation material may relate to a plastisol, preferably a PVC plastisol. The pretreatment can take place in an offline step.

The weight of the glass fiber layer can be situated between 30 and 100 grams per square meter. However, preferably this weight is lower than 65 grams per square meter. This offers the advantage that the glass fiber layer can be embedded easier and faster into the substrate. Moreover, such more light-weight glass fiber results in only a slight to no reduction of the dimensional stability, at least not as the one applied with rigid substrate layers, as the inventor, rather unexpectedly, has found.

In the floor panel preferably a second glass fiber layer is present. The use of more than one glass fiber layer has proven more effective than the use of a single glass fiber layer. The second glass fiber layer may show one or more of the characteristics of the first-mentioned glass fiber layer.

In particular, the first as well as the second glass fiber layer have a weight lower than 65 or at most 50 grams per square meter. This has a positive influence on the processing speed and practically no detrimental influence on the dimensional stability, at least not in the application with rigid substrate layers.

The two glass fiber layers preferably are situated offset from the center of the floor panel. In this manner, their effect is better distributed over the floor panel. Preferably, the one glass fiber layer is situated in the lower half of the floor panel, while the other glass fiber layer is situated in the upper half.

The two glass fiber layers preferably are situated at a vertical distance from each other of at least ⅕ times or at least ¼ times the thickness of the floor panels. This provides for a good distribution of the effect of the glass fiber panels over the overall thickness of the floor panel. Most preferably, they are situated at a vertical distance from each other of approximately ⅓ the thickness of the floor panel.

Preferably, the two glass fiber layers enclose the first substrate layer. Herein, the upper side thereof is bordered by the one glass fiber layer, and the lower side thereof by the other glass fiber layer. The thickness of the first substrate layer in this case preferably is at least ⅕, at least ¼ or approximately ⅓ times the overall thickness of the floor panel. The two glass fiber layers preferably are situated offset from the center of the floor panel, such that the center line of the floor panel in this case runs through the first substrate layer.

The one glass fiber layer preferably is enclosed between the first substrate layer and a second rigid substrate layer of thermoplastic material, while the other substrate layer preferably is enclosed between the first substrate layer and a third rigid substrate layer of thermoplastic material. This results in a particularly balanced and stable sandwich structure. The second and the third substrate layer can show one or more of the characteristics of the first substrate layer. The first substrate layer preferably is situated centrally, i.e., the center line of the floor panel passes therethrough, whereas the second and third substrate layer preferably are situated in the center, with the second substrate layer in the upper half and the third substrate layer in the lower half of the floor panel. The second and the third substrate layer preferably are made thinner than the first substrate layer, however, preferably the thickness thereof is at least ⅕ or at least ¼ of the thickness of the first substrate layer. The third substrate layer preferably is made thicker than the second substrate layer, however, maximum 2.5 or maximum 2 times as thick.

The one or more rigid substrate layers of thermoplastic material form a rigid part of the floor panel. This rigid part preferably has an overall thickness of at least 2 mm. Namely, the inventor has found that as from such thickness the resistance against telegraphy effects and the bending stiffness is very good. Still better the overall thickness of the rigid part is at least 2.5 mm or at least 3 mm. the overall thickness of the rigid part preferably is maximum 8 mm, maximum 6 mm or maximum 4 mm. In this manner, the weight of the panels can remain limited. The overall thickness of the rigid part preferably is situated between 2 and 8 mm, between 2 and 6 mm or between 2 and 4 mm. The overall thickness of the rigid part preferably is at least 50%, at least 60% or at least 65% of the overall thickness of the floor panel.

The substrate preferably comprises a substrate layer which is more flexible or compressible than the first rigid substrate layer. This more flexible substrate layer offers the advantage that the sound, which is created when the installed floor panels are walked upon, can be damped. Preferably, this flexible substrate layer is situated between the first substrate layer and the decor. Preferably, this more flexible substrate layer is situated directly underneath the decor or the possible decor carrier on which the decor is provided. In that case, it also assists in efficiently obtaining deep relief structures in the upper side of the floor panel. For this purpose, it is indeed desirable to deform the material underneath the decor, which is easier when this material is relatively flexible.

The more flexible substrate layer preferably is constructed of thermoplastic material, wherein PVC best is used as the thermoplastic synthetic material, however, wherein the use of other synthetic materials, such as polyethylene, polypropylene, polyester, such as PET, polyurethane and/or elastomer, is not excluded. The flexibility of this substrate layer preferably is obtained by realizing the thermoplastic material thereof as soft or semi-rigid. This is possible by using an appropriate amount of plasticizers, certainly in the case that PVC is applied as the thermoplastic synthetic material. The amount of plasticizers in the more flexible substrate layer preferably is at least 15 phr and still better at least 20 phr. Examples of plasticizers which can be used, certainly in the case of PVC, are phthalate-based plasticizers, such as DINP or DOP, or, as an alternative for phthalate-based plasticizers, DOTP or DINCH.

When realizing the more flexible substrate layer, an extrusion, calendering or strewing technique can be applied.

It is preferred that the more flexible substrate layer is connected to the first or the possible second rigid substrate layer via thermal lamination, which, compared to the use of glue or the like, restricts the risk of delamination. Preferably, this is performed by a calendering process, for example, by means of a calendering device consisting of more than two calendering rollers.

However, it is not excluded that the more flexible substrate layer is composed of another material than thermoplastic material. For example, it is possible that this substrate layer relates to a carpet layer, or a textile layer in general, or is made of rubber or cork. In these cases, it is preferred that the respective substrate layer is connected to the first or possible second rigid substrate layer by means of glue or the like, preferably a waterproof glue, such as hot-melt glue. Herein, it is also noted that, in the case of, for example, a carpet layer, the decor actually is comprised in this carpet layer.

The thickness of the more flexible substrate layer preferably is situated between 0.5 and 3 mm, still better between 0.5 and 2 mm and best between 0.5 and 1 mm, or between limits included, as with these thicknesses the herein above-described advantages will show particularly well.

The substrate may comprise a substrate layer at its lower side, which layer preferably is more flexible or more compressible than the first rigid substrate layer. By such substrate layer situated at the lower side of the substrate, the advantage is obtained that the noise that is created when the installed floor panels are walked upon, can be damped. This substrate layer can be composed of thermoplastic material, wherein the use of synthetic materials, such as PVC, polyethylene, polypropylene, polyester, such as PET, polyurethane and/or elastomer, is possible. The respective substrate layer preferably is foamed, considering that this can improve the sound-absorbing features thereof. A preferred embodiment of such substrate layer is one that comprises XPE or cross-linked polyethylene foam.

When realizing said substrate layer situated at the lower side of the substrate, an extrusion, calendering or strewing technique can be used.

It is an option to connect this substrate layer with the first or possible third rigid substrate layer by thermal lamination, which, compared to the use of glue or the like, restricts the risk of delamination. However, it is not excluded that the respective substrate layer is connected to the first or possible third substrate layer in another manner, such as with glue or the like, in which case preferably a waterproof glue, such as hot-melt glue, is used.

It is also not excluded that the backing layer is composed of another material than thermoplastic material. For example, it is possible that the backing layer relates to a textile layer or is composed of cork or rubber. In these cases, it is preferred that the backing layer is connected to the core by means of glue or the like, preferably a waterproof glue, such as hot-melt glue.

The thickness of said substrate layer located at the lower side of the substrate preferably is situated between 1 and 4 mm, still better between 1 and 3 mm and best between 1 and 2 mm, limits included, wherein a thickness of approximately 1.5 mm has proven ideal.

The decor preferably relates to an imprinted or printed decor, wherein this imprinted or printed decor best depicts a natural product, such as wood or stone. In the case of wood, the decor can depict, for example, wood nerves and/or wood pores. For imprinting or printing, any of the following techniques can be used: offset printing, rotogravure printing and a digital printing technique, wherein, for example, a digital printer or inkjet printer is employed.

The decor can be imprinted or printed on a decor carrier. Or the decor can be imprinted or printed directly on the substrate, in which case this relates to a so-called "direct print". Herein, it is possible that the substrate is provided with a base coat or primer, possibly a plurality of base coats or primers, prior to imprinting or printing thereon.

When the decor is imprinted or printed on a decor carrier, this preferably relates to a foil or film, which can be thermoplastic. This may relate, for example, to a foil or film of PVC, polyethylene, polypropylene, polyurethane, or polyester, such as PET.

It is also possible that the decor carrier relates to a cellulose-based layer, preferably impregnated with a resin. For example, the cellulose-based layer relates to paper, such as standard paper or a kraft paper. The resin preferably comprises melamine resin and/or a phenolic resin.

It is also noted that, in the case that the decor carrier relates to a cellulose-based layer, also one or more cellulose-based layers, such as paper, can be present there underneath, which improves the rigidity of the floor panel. These one or more additional cellulose-based layers preferably are impregnated with resin, such as melamine and/or phenolic resin.

As an alternative for an imprinted or printed decor, for example, a veneer of wood or stone can be provided on the substrate, which then forms the decor. Preferably, the possible wood veneer is treated, such that it is waterproof or largely waterproof.

Preferably, the floor panel comprises a wear and/or lacquer layer provided on the decor for protecting the decor and for preventing it from wear. Preferably, these layers are transparent or translucent, such that the decor remains visible.

The wear layer preferably relates to a foil or film, which best is thermoplastic. This may relate, for example, to a foil or film of PVC, polyethylene, polypropylene, polyurethane or polyester, such as PET. The thickness of such foil or film preferably is situated between 250 and 750 micrometers, limits included. This type of wear layer preferably is applied in the case that the decor is imprinted or printed on a foil or film.

It is also possible that the wear layer relates to a cellulose-based layer, preferably impregnated with a resin. For example, the cellulose-based wear layer relates to paper, such as standard paper or a kraft paper. The resin preferably comprises melamine resin and/or a phenolic resin. Preferably, the cellulose-based wear layer comprises wear-resistant particles, such as ceramic particles or corundum. This type of wear layer preferably is applied in the case that the decor is imprinted or printed on a cellulose-based layer.

The lacquer layer preferably is realized on the basis of urethane acrylates, polyester acrylates and/or epoxide acrylates. Preferably, this relates to a lacquer layer which can be hardened by means of UV radiation or excimer radiation.

The lacquer layer can comprise ceramic particles, such as aluminum oxide and/or silica. The lacquer layer can be provided prior or after forming the possible relief in the upper side of the floor panel. Certainly, with a rather deep relief, for example, relief reaching deeper than 100 or 250 microns, it is advantageous to provide the lacquer layer prior to forming the relief, such as known from document BE 2016/5732, considering that this helps preventing interruptions in the lacquer layer. This certainly proves its usefulness when applying high-gloss wear layers, such as wear layers of PVC, as in this manner the occurrence of blinking spots resulting from such wear layers can be avoided, such as described in document BE 2016/5732.

It is also noted that a plurality of lacquer layers can be present above the decor. This is particularly advantageous in the case that a relief is provided in the upper side of the floor panel. In that case, a first lacquer layer can be provided prior to forming the relief, in order to provide for that these lacquer layer does not show any interruptions and to prevent the occurrence of blinking spots, and a second after the relief has been formed, wherein for this second lacquer layer a harder lacquer can be applied, which principle is known as such from BE 2016/5732.

It is also noted that the invention allows applying stiffer lacquers. This is because of the presence of the rigid substrate layer. In fact, this substrate layer can counteract the crimp to which the lacquer is subject, without the panel thereby warping or deforming. The application of stiffer lacquers offers the advantage that they are more effective and provide for a better mechanical and chemical resistance.

The upper side of the floor panel can show a relief simulating the texture of a natural product, such as wood, stone or ceramics. In the case of wood, the relief may simulate, amongst others, wood nerves and/or wood pores. Possible bevels on one or more of the edges of the upper side of the floor panel do not belong to such relief and are not considered as forming part of the relief, in view of the fact that they are not directed to simulating a natural texture, but rather to achieving a plank effect. The relief can be provided by means of mechanical and/or chemical embossing.

The relief preferably has a maximum relief depth which is larger than 100 microns and still better is larger than 200 or 250 microns. Such deep relief provides for that the floor panel will look and feel very natural. With such deep relief, it is particularly advantageous when a more flexible substrate layer, as described herein above, is applied. In fact, such substrate layer can be easily deformed or impressed in order to form the deep relief.

In the case that a relief is formed in the upper side of the floor panel, best a wear layer is present in which the relief extends. It is possible that the relief, certainly with a deep relief, extends in the wear layer, however, up into the substrate, preferably up into the possible more flexible substrate layer.

The relief may or may not be performed in register with the decor. Performing in register entrains the advantage that a more naturally looking and feeling floor panel is obtained. Various techniques are known in order to realize such "in register" embodiment, in particular from the following documents: EP 2 636 524, EP 2 447 063 and EP 2 447 064.

It is noted that, in the case that a veneer of wood or stone is provided above the substrate, the upper side of the floor panel automatically is given a relief with the texture of wood or stone, respectively.

The upper side of the floor panel can comprise a bevel on one or more edges thereof. This may relate to a bevel which does not reach deeper than the possible wear layer. However, it is possible that the bevel reaches deeper than the wear layer, for example, up into the substrate, in which case the bevel preferably is decorated. This is possible by providing a separate decoration on the bevel, i.e., a decoration separate from the decor, such as a lacquer, paint or transfer foil. Or the decor may extend uninterruptedly over the bevel. In that case, this may relate to a so-called "pressed bevel", wherein the bevel is formed by impressing the upper side of the floor panel, including the decor, in the proximity of an edge thereof.

The floor panel preferably shows one or more of the following characteristics:

the floor panel bends under the own weight thereof less than 10 cm per meter and still better less than 5 cm per meter; and/or the floor panel shows a modulus of elasticity or Young's modulus of at least 2000 N per square millimeter, at least 3000 N per square millimeter or at last 3500 N per square millimeter.

The bending can be measured by fixedly clamping the floor panel on one extremity thereof and measuring the bending of the remaining free portion. In the case of an oblong rectangular panel, the fixedly clamped extremity may concern, for example, one of the longitudinal extremities.

The modulus of elasticity has to be understood as the one at a room temperature of 25 degrees Celsius.

The overall thickness of the floor panel preferably is situated between 3 and 10 mm, or between 3 and 8 mm, or between 3.5 and 8 mm, or between 3.5 and 6 mm, or between 4 and 6 mm, limits included, wherein an ideal thickness is about 4.5 mm.

The mechanical locking effected by the coupling parts in the coupled condition of two of such floor panels can be operative at least or exclusively in the horizontal direction, i.e., the direction in the plane of the coupled floor panels which is perpendicular to the coupled edges. This horizontal locking can be realized by cooperating locking surfaces. The zone in which these locking surfaces cooperate, preferably is situated at least partially or entirely in the first, the possible second or the possible third rigid substrate layer, which offers the advantage that a strong locking can be provided and the formation of gaps can be minimized. It is also a possibility to situate the glass fiber layer at the height of this zone, which improves the strength of the locking.

The mechanical locking effected by the coupling parts in the coupled condition of two of such floor panels, can be operative at least or exclusively in the vertical direction, i.e., the direction perpendicular to the plane of the coupled floor panels. This vertical locking can be realized by cooperating locking surfaces, wherein the zone in which these locking surfaces cooperate, preferably is situated at least partially or entirely in the first, the possible second or the possible third rigid substrate layer, which offers the advantage that a strong locking can be provided, and the formation of gaps can be minimized. It is also a possibility to situate the glass fiber layer at the height of this zone, which improves the strength of the locking.

It is preferred that both a horizontal and a vertical locking are present, best realized by cooperating locking surfaces, wherein the zone or zones in which the locking surfaces cooperate preferably are situated at least partially in the first, the possible second or the possible third rigid substrate layer. The glass fiber layer can be situated at the height of a zone in which locking surfaces cooperate. In the case that there are a plurality of zones in which locking surfaces cooperate, these glass fiber layers, when using a plurality of glass fiber layers, or at least a part of these glass fiber layers, may be situated at the height of the aforementioned zones.

The coupling parts can be realized as a tongue and groove connection, the groove being bordered by an upper and a lower lip. This connection preferably comprises locking elements, for example, in the form of a protrusion at the lower side of the tongue and a recess in the upper side of the lower lip, which, in the coupled condition, counteract the moving apart of the tongue and the groove in the horizontal direction. Preferably, this tongue and groove connection shows one or more of the following characteristics, as far as they are not contradictory, which characteristics all increase the stability and strength of the locking:

the upper lip is at least partially realized from the first or the possible second rigid substrate layer;

the lower lip is at least partially realized from the first or the possible third rigid substrate layer;

the center line through the tongue is situated in the first rigid substrate layer;

the most inwardly located point of the groove is situated in the first rigid substrate layer;

the zone where the upper side of the tongue cooperates with the lower side of the upper lip is situated at least partially or entirely in the first or the possible second rigid substrate layer;

the zone where the possible locking elements cooperate is situated at least partially or entirely in the first or the possible third rigid substrate layer;

the glass fiber layer is situated at the height of the zone where the upper side of the tongue cooperates with the lower side of the upper lip;

the glass fiber layer is situated at the height of the zone where the possible locking elements cooperate;

the glass fiber layer is situated on the center line through the tongue; the glass fiber layer is situated at the height of the most inwardly located point of the groove;

in the case that the zone where the upper side of the tongue cooperates with the lower side of the upper lip is situated at another location than the zone where the possible locking elements cooperate, preferably at least two glass fiber layers are present, wherein it is preferably valid that the one glass fiber layer is situated at the height of the zone where the upper side of the tongue cooperates with the lower side of the upper lip, and the other is situated at the height of the zone where the possible locking elements cooperate;

the glass fiber layer extends uninterruptedly or continuously through the lower lip or the upper lip; and/or the glass fiber layer extends uninterruptedly or continuously in at least one of the coupling parts.

The coupling parts realized as a tongue and groove connection preferably are selected from the following types:

the type wherein the coupling parts are configured such that they allow coupling two of such floor panels at the respective edges by means of a turning movement, wherein the floor panel with the tongue, from an inclined position in which the tongue already is partially situated in the groove, is turned downward in order to bring the tongue completely into the groove and couple the respective edges to each other;

the type wherein the coupling parts are configured such that they allow coupling two of such floor panels at the respective edges by means of a substantially linear movement in the plane of the floor panels and substantially perpendicular to the respective edges, preferably with the performance of a snap action;

the type wherein the coupling parts are configured such that they allow coupling two of such floor panels at the respective edges both by means of a turning movement as described herein above and by means of a substantially linear movement in the plane of the floor panels and substantially perpendicular to the respective edges, preferably with the performance of a snap action.

It is also noted that the tongue and groove connection, in the case that the floor panel is square or oblong rectangular, can be applied at each of the pair of opposite edges of the floor panel.

Alternatively, the coupling parts can be realized in the form of hook-shaped parts, consisting of, on the one hand, an upward-directed hook-shaped locking part with a lip and an upward-directed locking element and, on the other hand, a downward-directed hook-shaped part with a lip and a downward-directed hook-shaped part, which locking elements, in the coupled condition of two of such floor panels, counteract the moving apart of the hook-shaped parts in the horizontal direction. The mechanical locking effected by these hook-shaped parts preferably also is operative in vertical direction, and to this end they may be provided with vertically active locking elements. Preferably, the hook-shaped parts show one or more of the following characteristics, which characteristics all improve the stability and strength of the locking:
  the lip of the downward-directed hook-shaped part is at least partially realized from the first or the possible second rigid substrate layer;
  the lip of the upward-directed hook-shaped part is at least partially realized from the first or the possible third rigid substrate layer;
  the zone where the upward-directed locking element cooperates with the downward-directed locking element in order to effect the horizontal locking, is situated at least partially or entirely in the first or the possible third rigid substrate layer;
  the zone or zones where the possible vertically active locking elements cooperate, are situated at least partially or entirely in the first, the possible second or the possible third rigid substrate layer;
  the glass fiber layer is situated at the height of the zone where the upward directed locking element cooperates with the downward-directed locking element in order to effect the horizontal locking;
  the glass fiber layer is situated at the height of the zone or zones where the possible vertical locking elements cooperate;
  in the case that the zone, where the upward-directed locking element cooperates with the downward-directed locking element in order to effect the horizontal locking, is situated at another location than a zone where the possible vertically active locking elements cooperate, preferably at least two glass fiber layers are present, wherein it is preferably valid that the one glass fiber layer is situated at the height of the zone where the upward-directed locking element cooperates with the downward-directed locking element in order to effect the horizontal locking, and the other is situated at the height of the zone where the possible vertically active locking elements cooperate;
  the glass fiber layer extends uninterruptedly or continuously in the lip of the downward-directed hook-shaped part or in the lip of the upward-directed hook-shaped part; and/or
  the glass fiber layer extends uninterruptedly or continuously in at least one of the hook-shaped parts.

The vertically active locking elements may or may not comprise a separate insert, preferably an elastically deformable and/or movable insert, which as such is known from, amongst others, the documents WO 2006/043893, WO 2008/068245 and WO 2009/066153. The insert offers the advantage that the strength of the vertical locking is largely independent of the material of the floor panel itself and that mostly a stronger vertical locking can be provided compared to locking elements which are realized from the material of the floor panel itself. Certainly, in respect to reduction of the risk of the formation of gaps between the mutually coupled floor panels, such insert thus is useful.

The insert preferably is provided in a recess in the upward-directed or the downward directed hook-shaped part. This recess preferably is situated at least partially in the first rigid substrate layer.

In the case that no use is made of such insert, the vertically active locking elements preferably are realized from the material of the floor panel itself and still better from the material of the first, the possible second or the possible third rigid substrate layer. The rigid character of this substrate layers provides for that these locking elements, too, provide for a strong vertical locking.

The hook-shaped parts preferably can be hooked into each other by means of a substantially linear movement perpendicular to the plane of the coupled floor panels or to the plane of the floor covering.

It is also noted that the hook-shaped parts, in the case that the floor panel is square or oblong rectangular, can be applied at each of the pair of edges of the floor panel.

Preferably, the floor panel is square or oblong rectangular and can be coupled to adjacent floor panels by means of the fold-down technique. To this aim, this floor panel comprises, on the one hand, on one pair of opposite edges, coupling parts which are realized in the form of a tongue and groove connection and which are of the type allowing to couple this floor panel to an already installed, similar floor panel, which is situated in a preceding row, by means of a turning movement, and, on the other hand, on the other pair of edges, coupling parts which are realized in the form of hook-shaped parts and which allow to couple the respective floor panel, in one and the same turning movement, to an already installed, similar floor panel situated in the same row. It has shown that this fold-down technique is excellently suited for installing the floor panel according to the invention.

It is also noted that, instead of a glass fiber layer, any reinforcement layer can be applied. Preferably, this is a reinforcement layer which comprises reinforcing fibers, such as carbon fibers.

According to an independent second aspect, the invention relates to a floor panel of the aforementioned type, with the characteristic that the substrate comprises a rigid, non-foamed substrate layer of thermoplastic material. Hereby, the floor panel, compared to floor panels with foamed substrate layers, is less sensitive to indentation effects, for example, under the influence of chair and/or table legs.

It is noted that this advantage also shows in the case that the rigid substrate is hardly foamed, i.e., in the case that due to the foaming the rigid substrate layer shows a density reduction of maximum 10%.

According to an independent third aspect, the invention relates to a floor panel of the aforementioned type, with the characteristic that the substrate comprises a substrate layer of thermoplastic material, which, by thermal lamination, is connected to a more flexible substrate layer which is situated between the decor and the rigid substrate layer. Hereby the risk of delamination is reduced.

According to an independent fourth aspect, the invention relates to a floor panel of the aforementioned type, with the characteristic that in the floor panel at least two glass fiber layers are present, each having a weight of less than 65 g per square meter or even at most 50 g per square meter.

It is also noted that each of the second to fourth aspects can be combined with one or more of the characteristics of the first aspect without necessitating that the floor panel must show the characteristic of this first aspect.

According to an independent fifth aspect, the invention relates to a method for manufacturing a floor panel with a substrate, comprising thermoplastic material, and a decor provided thereon, wherein the method comprises the following steps:

- providing a first rigid substrate layer of thermoplastic material by means of a first strewing treatment;
- providing a glass fiber layer on the strewn substrate layer;
- providing a second rigid substrate layer of thermoplastic material on the glass fiber layer, by means of a second strewing treatment;
- consolidating the strewn substrate layers and the glass fiber layer under the influence of pressure and/or heat;
- providing, on the consolidated second substrate layer, a more flexible or more compressible substrate layer of thermoplastic material by applying this thermoplastic material in liquid condition.

The particularity of the method is that the rigid substrate layers are consolidated and only then the more flexible substrate layer is provided thereon. This allows regulating the consolidation parameters, such as pressure and/or temperature, in an optimum manner in function of the features of the thermoplastic material of the rigid substrate layers, which are different from those of the more flexible substrate layer, considering the difference in rigidity/flexibility.

The thermoplastic material of the first and/or second substrate layer may be strewn in the form of grains or powder. Preferably, this material, or at least a part thereof, is strewn in granulate form, however, it may be advantageous to strew it as a dry blend, certainly in the case that this material, or a part thereof, must be foamed. Such dry blend in fact guarantees the features of the foaming agents added to the material, as described in document BE 2015/5572, in a better manner.

The consolidation may be performed in a press device, preferably a double-belt press device. This press device may comprise an S-roller, which can provide for a calibration of the strewn material.

Preferably, the more flexible substrate layer is provided on the second substrate layer by means of a calendering device. The calendering device preferably comprises more than two calendering rollers.

It is clear that the method also can comprise providing the decor and possible wear and/or lacquer layers.

The aforementioned layers preferably form a continuous material web, which finally is divided into individual pieces, for example, by means of cutting treatments, for forming the floor panels.

After dividing into individual pieces, the floor panels, along one or more edges, can be provided with coupling parts which allow effecting a mechanical coupling between two of such floor panels. Providing these coupling parts preferably is performed by means of cutting tools, such as milling tools.

The floor panel which is obtained according to the invention further may show one or more of the characteristics of the floor panel according to said first, second, third and/or fourth aspects.

It is noted that the present invention is not applicable with floor panels only. It can be applied in an advantageous manner with any type of panels, such as wall panels, ceiling panels or door panels.

The invention can also be applied more broadly than with panels only. It can be advantageously applied with any type of floor, wall, ceiling or door elements. Examples thereof are floor elements on roll or wall-to-wall floor elements, such as wall-to-wall vinyl.

It is also noted that with each of the mentioned value intervals the limits are included, if not explicitly stated otherwise.

BRIEF DESCRIPTION OF THE DRAWINGS

With the intention of better showing the characteristics of the invention, herein below, as an example without any limitative character, some preferred embodiments are described, with reference to the accompanying drawings, wherein:

FIG. 1 represents a floor panel according to the invention;

FIG. 2 represents a cross-section according to line 11-11 in FIG. 1;

FIGS. 3 and 4 represent how the edges of FIG. 2 can be coupled;

FIG. 5, at a larger scale, represents what is indicated by F5 in FIG. 2;

FIGS. 6 to 13 represent variants of FIG. 2;

FIGS. 14 and 15 represent how floor panels can be coupled according to the fold-down technique;

FIG. 20 represents a method according to the invention; and

FIGS. 21 and 22 represent variants.

DETAILED DESCRIPTION OF THE INVENTION

Figure 6:
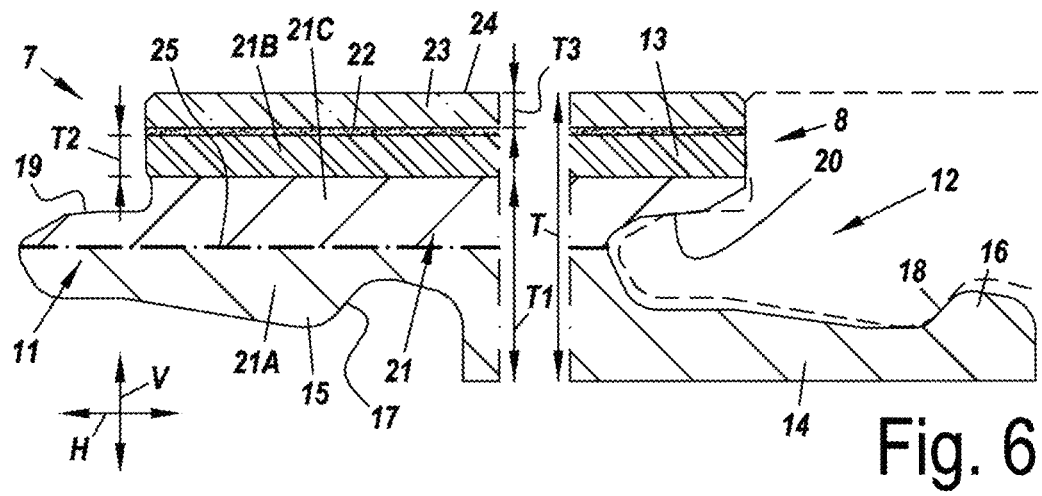

FIG. 1 represents a floor panel 1 according to the invention. The represented floor panel 1 comprises a decor 2, which relates to printed wood decor. This relates to an oblong rectangular floor panel 1, which as a result has a pair of long edges 3-4 and a pair of short edges 5-6. Each pair of edges is provided with coupling parts, which are indicated by the reference numbers 7-8 and 9-10, respectively.

The shape of the coupling parts 7-8 is evident from FIG. 2. This relates to a tongue and groove connection comprising a tongue 11 and a groove 12, the groove being bordered by an upper lip 13 and a lower lip 14. The lower lip 14 protrudes to beyond the upper lip 13. Additionally, the connection comprises locking elements 15-16, in the form of a protrusion 15 on the lower side of the tongue 11 and an upward-directed locking element 16 in the portion of the lower lip 14 that protrudes beyond the upper lip 13, which, by cooperating locking surfaces 17-18, counteract the moving apart of the tongue 11 and the groove 12 in the horizontal direction H. The upper side 19 of the tongue 11 cooperates with the lower side 20 of the upper lip 13 in order to counteract the separation in the vertical direction V.

FIGS. 3 and 4 show how the coupling parts 7-8 can be coupled by means of a turning movement (FIG. 3) as well as a substantially horizontal snap movement (FIG. 4).

FIG. 2 also shows the construction of the floor panel 1. It is constructed of a substrate 21, a decor carrier 22 with decor 2, a wear layer 23 and a lacquer layer 24.

The substrate 21 consists of two substrate layers 21A and 21B realized on the basis of PVC.

The substrate layer 21A is rigid. For this purpose, no plasticizers are present in this layer 21A, or plasticizers are present in an amount of less than 15 phr only. Examples of plasticizers which can be used have already been mentioned. Also, the substrate layer 21A comprises a proportion of filler situated between 30 and 70 percent by weight. Preferably, chalk, talc and/or lime is used, possibly supplemented with wood, bamboo and/or cork particles. Further, the substrate layer 21A can comprise an impact modifier, a stabilizer, such as a Ca/Zn stabilizer, and/or a color pigment, such as carbon black. The thickness T1 of the substrate 21A is at least 2 mm. The result is that the substrate layer 21A has a high bending stiffness. This is advantageous, considering that the risk of warping of the floor panel 1 and of forming pushed-up edges under incident sunlight already is counteracted to a certain extent.

This risk is significantly reduced further due to the presence of the glass fiber fleece 25. Although it does not seem to be able to prevent the expansion/shrinkage of the substrate 21 with varying temperatures, it indeed counteracts the warping or pushing up. This actually is the most important, considering that the expansion/shrinkage as such can be counteracted by providing suitable expansion spaces, which also is known as such in the field of the wood laminate floors. The glass fiber fleece 25 is enclosed between the substrate layer 21A and 21B. In this manner, it can perform its function at its best. Possibly, the glass fiber fleece 25 is at least partially impregnated with thermoplastic material of the substrate layers 21A and/or 21B. This provides for a strong embedding in the substrate 21, such that it can perform its function even better. The position of the glass fiber layer 25 provides for that it extends uninterruptedly in both coupling parts 7-8. This is positive for the effectivity thereof, certainly at the respective edges 3-4 of the panel 1.

The rigid substrate layer 21A is obtained by means of a strewing process. By such process, a very good connection with the glass fleece 25 can be obtained. In such process, the glass fleece 25 can also have a support function. Possibly, the glass fleece 25 can also form a separation between the strewn layer 21A and the layer 21B in case the latter also would be strewn. This is certainly useful prior to consolidating, as this prevents a mutual mixing of the strewn material among the layers.

Also, the substrate layer 21A is not foamed. In comparison with foamed layers, hereby a better resistance against telegraphy and indentation effects is offered. The density of the layer 21A is situated between 1300 and 2000 kg per cubic meter.

The zone where the upper side 19 of the tongue and the lower side 20 of the upper lip cooperate, is situated entirely in the rigid substrate layer 21A, just like the zone where the locking elements 15-16 cooperate. This provides for that a strong mechanical coupling can be effected, wherein gap formation will arise less easily. The upper lip 13 is partially realized from the layer 17A, and the lower lip 14 even entirely. This provides for a reduced risk of breaking of one or both of the lips 13-14. Certainly, with the lower lip 14, this is advantageous as this lip 14 may not break as a result of the possible bending it is subjected to during the coupling of the edges 3-4. Otherwise, the coupling will be lost.

The substrate layer 21B is more flexible than the layer 21A. To this aim, in this layer 21B more plasticizers are present, namely at least 15 phr. This flexible layer 21B provides for that, regardless of the relatively stiff panel 1, no ticking sound is created when this panel 1 is walked upon. Thus, due to the soft character, it has sound absorbing properties. Moreover, such layer 21B is easier to deform in order to create a deep relief in the upper side of the panel 1. The proportion of filler in this layer 21B is situated between 30 and 70 percent by weight. Further, the substrate layer 21B can comprise an impact modifier, a stabilizer, such as a Ca/Zn stabilizer, and/or a color pigment, such as carbon black. The thickness T2 of the substrate layer 21B is situated between 0.5 and 1 mm.

The layers 17A and 17B are connected to each other by means of thermal lamination. In this manner, a reduced risk of delamination is obtained in comparison with the use of glue or the like.

The decor carrier 22 on which the decor is printed relates to a PVC film or foil.

The transparent wear layer 23 relates to a PVC layer with a thickness situated between 250 and 750 micrometers.

The overall thickness T of the floor panel 1 is situated between 3.5 and 6 mm.

FIG. 5 better shows the lacquer 24 which is provided on the wear layer 23. This relates to a lacquer realized on the basis of urethane acrylate. The relief 26 provided in the upper side of the panel 1 is visible, too.

FIG. 6 shows coupling parts 7-8 similar to those from FIG. 2, however, the substrate 21 is constructed differently. The layer 21A is constructed similar to the layer 21A of FIG. 2, however, thinner. Anyhow, a second rigid substrate layer 21C is present in the substrate 21As well, which also is made of PVC. The substrate layer 21C contains no plasticizers, or plasticizers in an amount of less than 15 phr only. The substrate layer 21C also comprises a proportion of filler situated between 30 and 70 percent by weight. Further, the substrate layer 21C can comprise an impact modifier, a stabilizer, such as a Ca/Zn stabilizer, and/or a color pigment, such as carbon black. The overall thickness T1 of the substrate layers 21A and 21C is at least 2 mm. The result is that the whole of both substrate layers 21A and 21C gives a high bending stiffness to the panel 1, which even is increased by the enclosed glass fleece 25. The position of the glass fleece 25 is such that it extends uninterruptedly through both coupling parts 7-8. And it is positioned at the height of the center line of the tongue 11 and goes through the most inwardly located point of the groove 12. Thus, at those locations additional support is given, which is beneficial for the strength of the tongue 11 and groove 12.

The rigid layers 21A and 21C are formed by means of a strewing process which is known as such from WO 213/179261. It offers the advantage that the glass fleece 25 can be embedded very well into the rigid whole, with a particularly stable sandwich as a result.

The rigid layer 21C also is not foamed.

Figure 7:
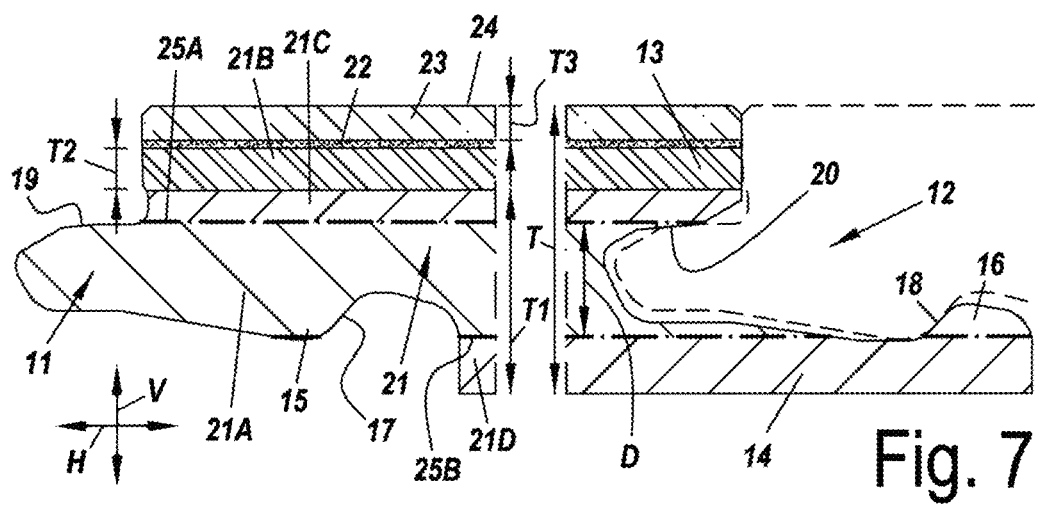

FIG. 7 shows coupling parts 7-8 similar to those from FIG. 6, however, the substrate 21 is constructed differently. The substrate layers 21A and 21C are constructed similar to the layers 21A and 21C of FIG. 6. However, there is a third rigid substrate layer 21D, which also is made of PVC. The substrate layer 21D contains no plasticizers, or plasticizers in an amount of less than 15 phr only. Also, the substrate layer 21D comprise a proportion of filler situated between 30 and 70 percent by weight. Further, the substrate layer 21D can comprise an impact modifier, a stabilizer, such as a Ca/Zn stabilizer, and/or a color pigment, such as carbon black. The overall thickness T1 of the substrate layers 21A, 21C and 21D is at least 2 mm. The result is that the whole of the substrate layers 21A, 21C and 21D gives a high bending stiffness to the panel 1, which even is increased by the presence of two enclosed glass fleeces 25A and 25B. The two glass fleeces 25A and 25B are located off the center of the panel 1 at a distance D from each other of at least ⅕ the thickness T of the panel 1. The substrate layers 21C and 21D are realized thinner than the center layer 21A, however, have a thickness of at least ⅕ the thickness of the center layer 21A. The result is a particularly balanced and stable sandwich construction. The substrate layers 21A, 21C and/or 21D as such may comprise a plurality of substrate layers and thus be multi-layered. The substrate layer 21A, for example, may comprise a plurality of substrate layers which may or may not have a mutually differing composition, such as a mutually differing proportion of filler or plasticizer. The same is applicable to the layers 21C and 21D and more generally to all substrate layers mentioned in this document.

The two glass fleeces 25A and 25B have a weight smaller than 65 gram per square meter. This has a positive influence on the process speed and practically no detrimental influence on the dimensional stability, at least not in the application with rigid substrate layers.

Figure 8:
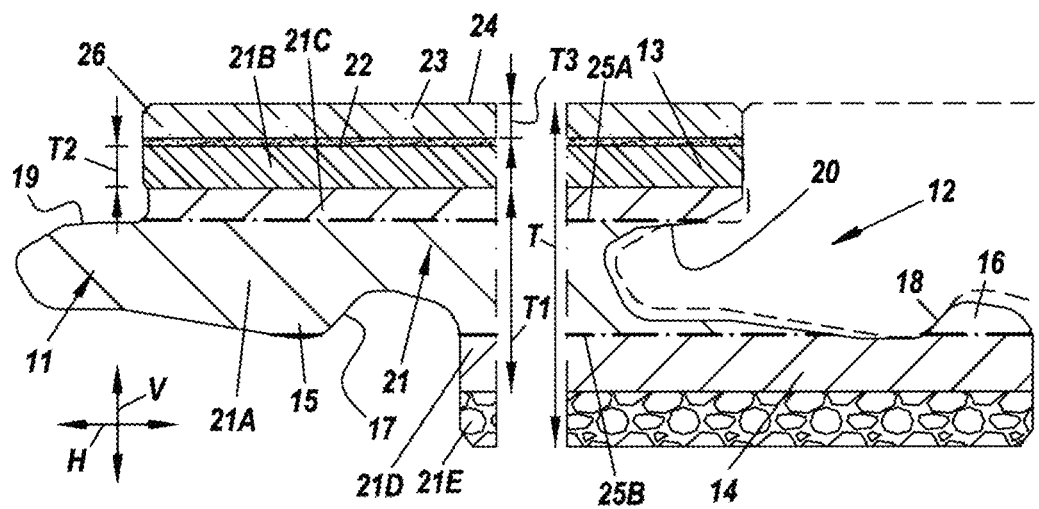

FIG. 8 shows a variant of FIG. 7, wherein the substrate 21 at the lower side comprises a sound-absorbing substrate layer 21E of XPE foam. The thickness of this layer 21E is situated between 1 and 2 mm.

Figure 9:
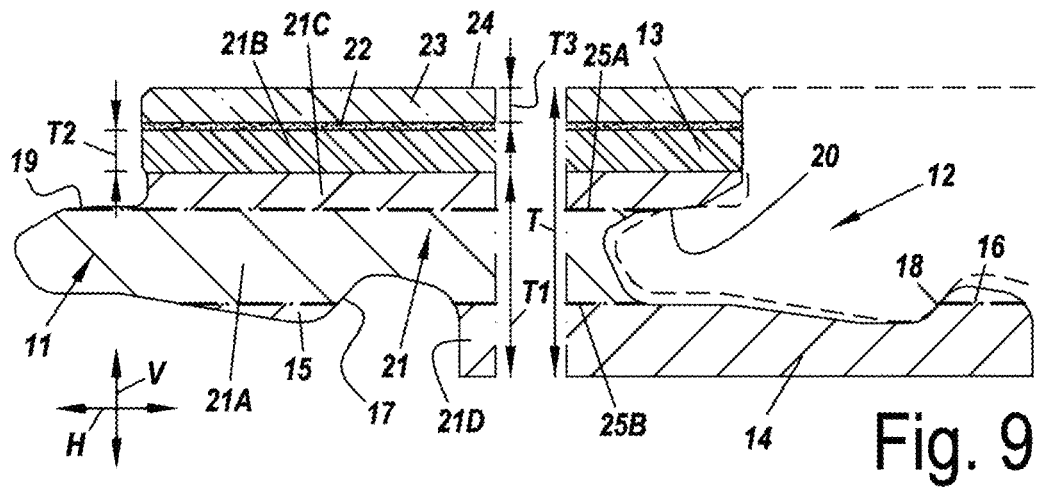

FIG. 9 shows a variant of FIG. 7, wherein the glass fleeces 25A-25B are positioned somewhat differently. The glass fleece 25A goes centrally through the zone where the upper side 19 of the tongue 11 cooperates with the lower side 20 of the upper lip 13, whereas the glass fleece 25 goes centrally through the zone where the locking elements 15-16 cooperate. This provides for an excellent horizontal and vertical locking.

Figure 10:
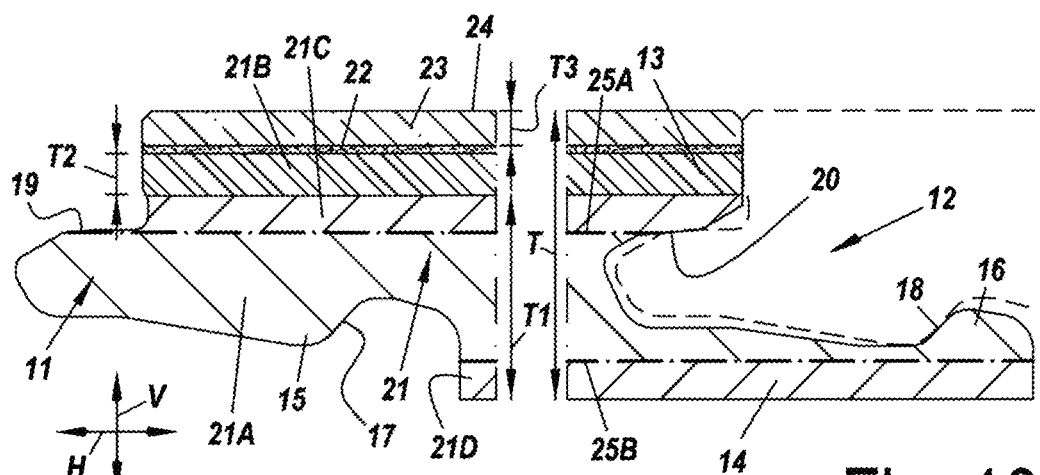

FIG. 10 shows a variant of FIG. 9. The glass fleece 25A is positioned similarly, however, the glass fleece 25B extends uninterruptedly in the coupling part 8. It extends continuously through the lower lip 14. This is beneficial for the strength of this lip 14.

Figure 11:
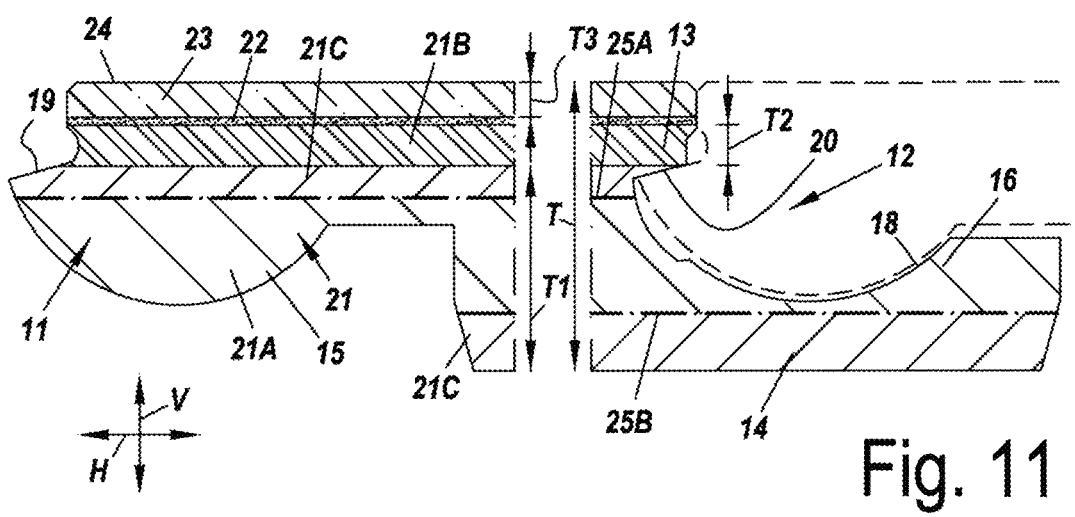

FIG. 11 shows a similar construction of the substrate 21As in FIG. 10, however, the coupling parts 7-8 have another configuration. The lower side of the tongue 11 is convex, while the upper side of the lower lip 14 is concave.

FIGS. 12 and 13 show two more variants, where the lower side of the tongue 11 and the upper side of the lower lip 14 comprise a flat part.

Figure 14:
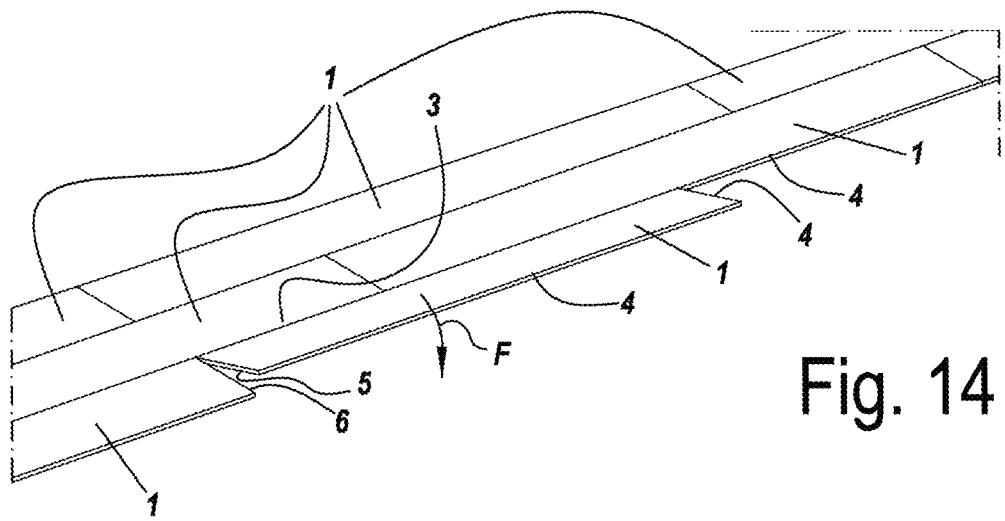

FIGS. 14 and 15 represent how floor panels 1 can be coupled to each other by means of the fold-down technique. To this aim, the short pair of edges 5-6 of the panel 1 is provided with the coupling parts 9-10 shown in FIG. 16. Those are realized in the form of a downward-directed hook 27 and an upward-directed hook 28. The downward hook 27 has a lip 29 with a downward-directed locking element 30, whereas the upward hook 28 has a lip 31 with an upward-directed locking element 32. The locking elements 30 and 32 cooperate, via locking surfaces 33-34, in order to counteract the moving apart of the hooks 27-28 in horizontal direction. The hooks 27-28 are also provided with vertically active locking elements 35-36. The vertically active locking element 35 is made as a separate insert, which is provided in a recess 37 in the downward hook 27. This recess is situated partially in the rigid layers 21A and 21C. It is also possible to provide the insert 35 in the upward hook 28.

The lip 29 is formed partially from the rigid layers 21A and 21C. The lip 31 is formed entirely from the rigid layers 21A and 21D. The zone where the locking elements 30 and 32 cooperate is situated entirely in the rigid layer 21A. All these measures are advantageous for the strength of the locking. The zone where the insert 35 cooperates with the locking element 36 is situated in the more flexible layer 21B. However, it is not excluded that this last zone is situated at least partially or entirely in the rigid layers 21A and/or 21C.

The glass fiber layer 25A is situated at the height of the recess 37. This provides for additional stability there, where the floor panel, due to the recess 37, is somewhat weaker.

The glass fiber layer 25A extends continuously in the lip 31 of the upward-directed hook 28.

Figure 16:
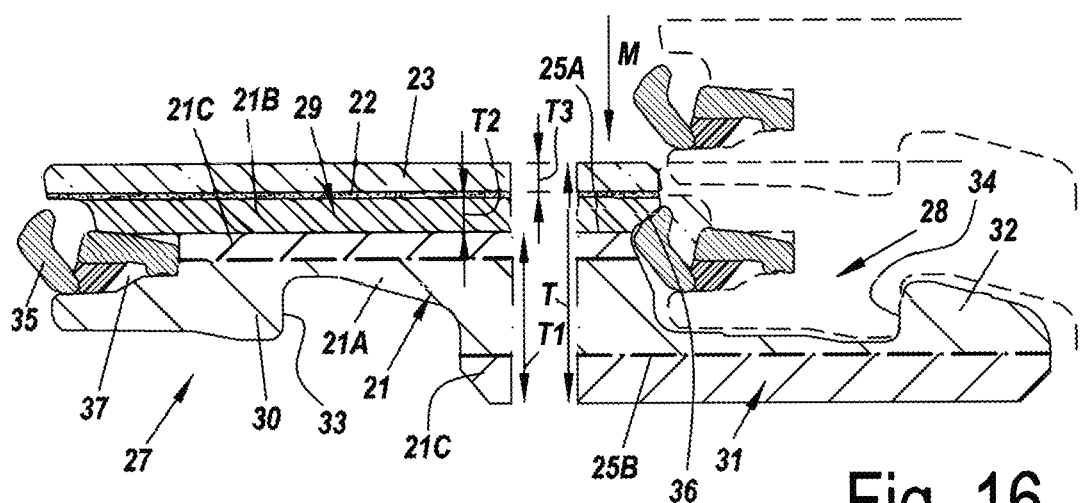
FIG. 16 represents coupling parts which can be applied with such fold-down floor panels.
Figure 17:
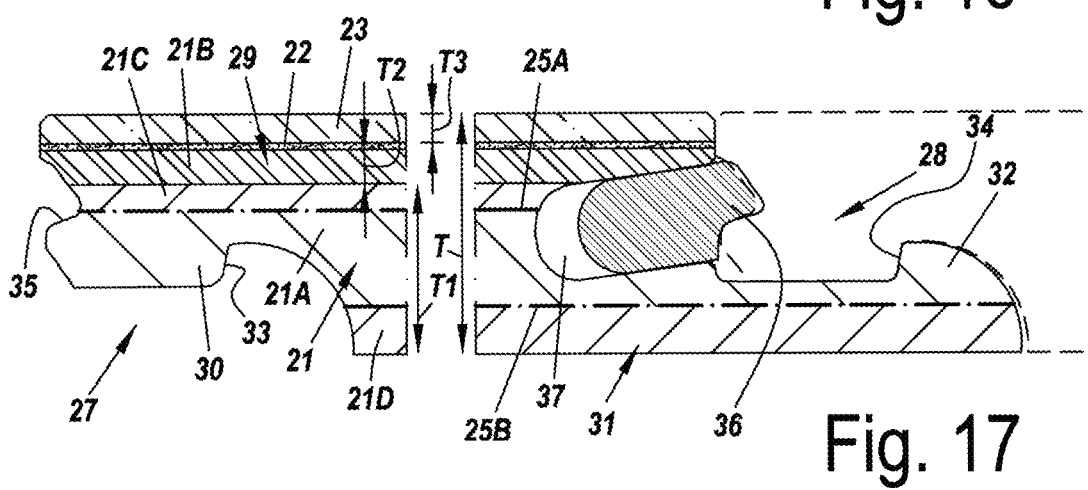
FIGS. 17 to 19 represent variants to FIG. 16.

FIG. 17 shows a variant of FIG. 16. Here, the insert 36 is provided in a recess 37 in the upward hook 28. The zone where the insert 36 cooperates with the locking element 35, however, indeed is situated in a rigid substrate layer, namely in the rigid layer 21A. This provides for a very good vertical locking.

Figure 18:
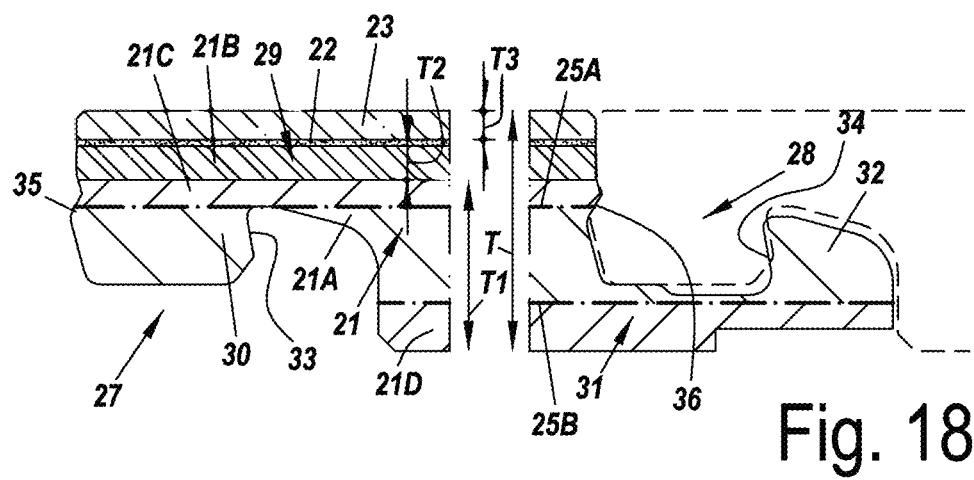

FIG. 18 shows a variant of FIGS. 16 and 17, wherein the vertically active locking elements are realized from the material of the panel 1. There, even two pairs of vertically active locking elements are present, namely the locking elements 35-36 as well as the locking surfaces 33-34, which provide for the horizontal as well as the vertical locking. All the vertical locking elements are made from the rigid layers 21A and 21C. Moreover, the glass fleece is situated at the height of the zone where the locking elements 35-36 cooperate. The glass fleece 25B extends continuously through the lip 31. This provides for that the lip 31 is realized very stable and the risk of damaging it, for example, during the elastic bending of the lip 31 during coupling, is very small, in spite of the recess provided in the lower side of the lip 31, which recess increases the bendability of the lip 31 and, thus, the ease of installation.

Figure 19:
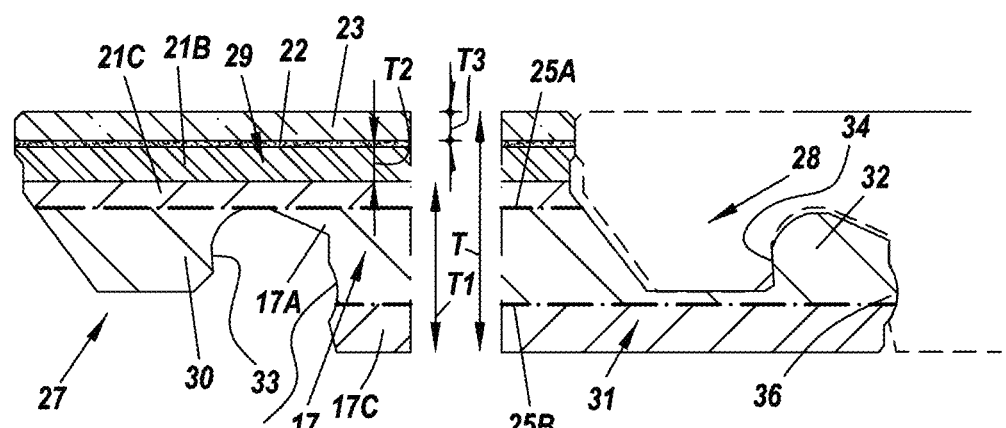

FIG. 19 shows a variant of FIG. 18, wherein the vertically active locking elements 35-36 are situated at the end of the lip 31. The glass fleece 25B goes therethrough.

FIG. 20 represents a method according to the fifth aspect of the invention. This method can be used in order to obtain the substrate construction of the panels 1 of, for example, FIG. 7.

By means of strewing treatments successively the rigid substrate layers 21D, 21A and 21C are provided. The rigid thermoplastic material thereof is strewn onto a transport belt 39 by means of strewing devices 38. On the strewn layers 21D and 21A a glass fleece 25B and a glass fleece 25A, respectively, is provided. To this aim, the glass fleeces 25A and 25B are unrolled from rollers 40 and provided on the respective substrate layers 21D and 21A. The formed complex subsequently is transported to a double-belt press 41, in which it is consolidated under the influence of pressure and/or heat. The press device 41 comprises, in transport direction, heating elements 42, an S-roller 43 and cooling elements 44. The heating elements 42 heat the complex brought into the press device 41, as a result of which the individual layers can be connected to each other more easily and better. The use of the S-roller 43 is advantageous as it provides for a calibration of the respective layers. The cooling elements 44 finally cool the consolidated complex, such that it can be processed more rapidly. Subsequently, the more flexible substrate layer 21B is provided on the consolidated whole, by means of calendering device 45 which consists of more than one calendering roller 46.

It is clear that in subsequent steps the decor carrier 22 with decor 2, the wear layer and the lacquer layer, 23 and 24, can be applied.

FIG. 21 shows a variant of FIG. 20. Here, the glass fleece 25 is brought into contact with a press element in the press device 43. This is different to FIG. 20, where each glass fleece is enclosed between rigid substrate layers.

FIG. 22 shows another alternative manner of providing a glass fleece 25 on a rigid substrate layer. Reference number 47 indicates an extrusion device with which the rigid substrate layer 21A is manufactured. This substrate layer 21 subsequently is transported between guide rollers 48. The glass fleece 25 is wound off a roll 49 and provided, between two of such guide rollers, on the substrate layer 21A. It is clear that this whole can be processed further and possibly can be supplemented with subsequent substrate layers and/or glass fleeces. It is also noted that this technique and be applied in an advantageous manner with any type of substrate layer of thermoplastic material, independently of whether this relates to a rigid, semi-rigid or flexible substrate layer.

The present invention further relates to several preferred embodiments as defined in the below numbered paragraphs:

1. Floor panel (1) with a substrate (17), comprising thermoplastic material, a decor (2) provided thereon, and, on at least one pair of opposite edges (3-4, 7-8), coupling parts (5-6, 9-10) realized at least partially from the substrate (17), said coupling parts allowing to effect a mechanical locking between two of such floor panels (1), characterized in that the substrate (17) comprises a rigid substrate layer (17A) of thermoplastic material, and a glass fiber layer (25) is present in the floor panel (1).

2. Floor panel according to paragraph 1, wherein the rigid substrate layer (17A) comprises plasticizers in an amount of less than 15 phr, less than 10 phr or less than 5 phr, or does not comprise any plasticizers.

3. Floor panel according to paragraph 1 or 2, wherein the thermoplastic material of the rigid substrate layer (17A) comprises PVC.

4. Floor panel according to any of the preceding paragraphs, wherein the thermoplastic material of the rigid substrate layer (17A) comprises a proportion of filler, which proportion preferably is situated between 30 and 70 percent by weight or between 45 and 65 percent by weight.

5. Floor panel according to paragraph 4, wherein the proportion of filler comprises an inorganic filler, such as chalk, lime and/or talc, and/or an organic filler, such as wood, bamboo and/or cork.

6. Floor panel according to any of the preceding paragraphs, wherein the rigid 25 substrate layer (17A) is not foamed.

7. Floor panel according to paragraph 6, wherein the density of the rigid substrate layer (17A) is situated between 1300 and 2000 kg per cubic meter or between 1500 and 2000 kg per cubic meter.

8. Floor panel according to any of the preceding paragraphs, wherein the glass fiber layer (25) relates to a glass fiber fleece.

9. Floor panel according to any of the preceding paragraphs, wherein the glass fiber layer (25) adjoins to the rigid substrate layer (17A).

10. Floor panel according to any of the preceding paragraphs, wherein the substrate comprises a second rigid substrate layer (17B) of thermoplastic material, which preferably is not foamed.

11. Floor panel according to paragraph 10, wherein the glass fiber layer (25) is enclosed between the first and the second rigid substrate layer (17A-17B).

12. Floor panel according to any of the preceding paragraphs, wherein a second glass fiber layer (25B) is present in the floor panel (1).

13. Floor panel according to paragraph 12, wherein the first and the second glass fiber layer (25A-25B) each have a weight smaller than 65 or at most 50 gram per square meter.

14. Floor panel according to paragraph 12 or 13, wherein the first and the second glass fiber layer (25A-25B) are situated off the center of the floor panel (1).

15. Floor panel according to any of the paragraphs 12 to 14, wherein the first and the second glass fiber layer (25A-25B) are situated at a vertical distance (V) of at least ⅕ times or at least ¼ times the thickness of the floor panel (T) from each other.

16. Floor panel according to any of the paragraphs 12 to 15, wherein the first and the second glass fiber layer (25A-25B) enclose the rigid substrate layer (17A), which in this case preferably is situated in the center of the floor panel.

17. Floor panel according to any of the paragraphs 12 to 16, wherein the first glass fiber layer (25A) is enclosed between the rigid substrate layer (17A) and the possible second rigid substrate layer (17B), and the second glass fiber layer (25B) is enclosed between the rigid substrate layer (17A) and a third rigid substrate layer (17C) of thermoplastic material, which third rigid substrate layer (17C) preferably is not foamed.

18. Floor panel according to paragraph 17, wherein the second and the third substrate layer (17B-17C) are made thinner than the first rigid substrate layer (17A), however, preferably have at least ⅕ times or at least ¼ times its thickness.

19. Floor panel according to paragraph 16 or 17, wherein the third substrate layer (17C) is made thicker than the second substrate layer (17B), however, preferably maximum 2.5 or maximum 2 times as thick.

20. Floor panel according to any of the preceding paragraphs, wherein the one or more rigid substrate layers (17A-17B-17C) of thermoplastic material have an overall thickness of at least 2 mm.

21. Floor panel according to any of the preceding paragraphs, wherein the one or more rigid substrate layers (17A-17B-17C) of thermoplastic material have an overall thickness of at least half of the overall thickness (T) of the floor panel (1).

22. Floor panel according to any of the preceding paragraphs, wherein the substrate, between the decor and the rigid substrate layer (17A), comprises a substrate layer (17D) of thermoplastic material which is more flexible or more compressible than the rigid substrate layer (17A).

23. Floor panel according to paragraph 22, wherein the more flexible substrate layer (17D) is situated directly underneath the decor or the possible decor carrier on which the decor is provided.

24. Floor panel according to paragraph 21 or 22, wherein the more flexible substrate layer (17D) is connected to the underlying part of the substrate (17) by means of thermal lamination.

25. Floor panel according to any of the preceding paragraphs, wherein the decor (2) relates to an imprinted or printed decor.

26. Floor panel according to any of the preceding paragraphs, wherein the floor panel (1) comprises a wear and/or lacquer layer (21 and/or 29) provided above the decor (2).

27. Floor panel according to any of the preceding paragraphs, wherein the floor panel (1) will bend under its own weight less than 10 cm per meter or less than 5 cm per meter.

28. Floor panel according to any of the preceding paragraphs, wherein the floor 10 panel (1) has a modulus of elasticity of at least 2000 N per square millimeter.

29. Floor panel according to any of the preceding paragraphs, wherein the overall thickness (T) of the floor panel (1) is situated between 3.5 and 6 mm.

30. Floor panel according to any of the preceding paragraphs, wherein the coupling parts (5-6) are realized as a tongue and groove connection, the groove (12) being bordered by an upper (13) and a lower lip (14), and wherein this connection comprises locking elements (15-16).

31. Floor panel according to paragraph 30, wherein the tongue and groove connection shows one or more of the following features, as far as they are not contradictory:
  the upper lip (13) is at least partially realized from the first (17A) and/or the possible second rigid substrate layer (17B);
  the lower lip (14) is at least partially or entirely realized from the first (17A) or the possible third rigid substrate layer (17C);
  the center line through the tongue (11) is situated in the first rigid substrate layer (17A);
  the most inwardly located point of the groove (12) is situated in the first rigid substrate layer (17A);
  the zone where the upper side of the tongue (11) cooperates with the lower side of the upper lip (13) is situated at least partially or entirely in the first (17A) or the possible second rigid substrate layer (17B);
  the zone where the locking elements (15-16) cooperate is situated at least partially or entirely in the first (17A) and/or the possible third rigid substrate layer (17C);
  the glass fiber layer (25) is situated at the height of the zone where the upper side of the tongue (11) cooperates with the lower side of the upper lip (13);
  the glass fiber layer (25) is situated at the height of the zone where the locking elements (15-16) cooperate;
  the glass fiber layer (25) is situated on the center line through the tongue (11);
  the glass fiber layer (25) is situated at the height of the most inwardly located point of the groove (12);
  in the case that the zone where the upper side of the tongue (11) cooperates with the lower side of the upper lip (13) is situated at another location than the zone where the locking elements (15-16) cooperate, preferably at least two glass fiber layers (25A-25B) are present, wherein it is preferably valid that the one glass fiber layer (25A) is situated at the height of the zone where the upper side of the tongue (11) cooperates with the lower side of the upper lip (13), and the other is situated at the height of the zone where the locking elements (15-16) cooperate;
  the glass fiber layer extends uninterruptedly or continuously in the lower lip or in the upper lip; and/or
  the glass fiber layer (25) extends uninterruptedly or continuously in at least one of the coupling parts (5-6).

32. Floor panel (1) with a substrate (17), comprising thermoplastic material, a decor (2) provided thereon, and, on at least one pair of opposite edges (3-4, 7-8), coupling parts (5-6, 9-10) realized at least partially from the substrate (17), said coupling parts allowing to effect a mechanical locking between two of such floor panels (1), characterized in that the substrate (17) comprises a rigid, non-foamed substrate layer (17A) of thermoplastic material.

33. Floor panel (1) with a substrate (17), comprising thermoplastic material, a decor (2) provided thereon, and, on at least one pair of opposite edges (3-4, 7-8), coupling parts (5-6, 9-10) realized at least partially from the substrate (17), said coupling parts allowing to effect a mechanical locking between two of such floor panels (1), characterized in that the substrate comprises a rigid substrate layer (17A) of thermoplastic material, which, via thermal lamination, is connected to a more flexible substrate layer (17D) which is situated between the decor (2) and the rigid substrate layer (17A).

34. Floor panel (1) with a substrate (17), comprising thermoplastic material, a decor (2) provided thereon, and, on at least one pair of opposite edges (3-4, 7-8), coupling parts (5-6, 9-10) realized at least partially from the substrate (17), said coupling parts allowing to effect a mechanical locking between two of such floor panels (1), characterized in that in the floor panel at least two glass fiber layers (25A-25B) are present, each having a weight of less than 65 g per square meter or even at most 50 g per square meter.

35. Method for manufacturing a floor panel (1) with a substrate (17), comprising thermoplastic material, and a decor (2) provided thereon, wherein the method comprises the following steps:
  providing a first rigid substrate layer (17A) of thermoplastic material by means of a first strewing treatment;
  providing a glass fiber layer (25) on the strewn substrate layer (17A);
  providing a second rigid substrate layer (17B) of thermoplastic material on the glass fiber layer (25), by means of a second strewing treatment;
  consolidating the strewn substrate layers (17A-17B) and the glass fiber layer (25) under the influence of pressure and/or heat;
  providing, on the consolidated second substrate layer (17B), a more flexible or more compressible substrate layer (17D) of thermoplastic material by applying this thermoplastic material in liquid condition.

36. Method according to paragraph 35, wherein the consolidation is performed in a press device (47).

37. Method according to paragraph 35 or 36, wherein the more flexible substrate layer (17D) is provided on the second substrate layer (17D) by means of a calendaring device.

38. Method according to any of the paragraphs 35 to 37, wherein the method also comprises providing the decor (2) and a possible wear and/or lacquer layer (21 and/or 29).

39. Method according to any of the paragraphs 35 to 38, wherein the aforementioned layers form a continuous material web, which finally is divided into individual pieces for forming the floor panels (1).

40. Method according to any of the paragraphs 35 to 39, wherein the method is employed for manufacturing a floor panel (1) according to any of the paragraphs 1 to 34.

The present invention is in no way limited to the herein above-described embodiments; on the contrary, such methods, floor panels and carrier material can be realized according to various variants without leaving the scope of the present invention.

The invention claimed is:

1. A floor panel comprising a substrate and a decor provided thereon, wherein said substrate comprises a rigid substrate layer of thermoplastic material, and wherein said rigid substrate layer of thermoplastic material is foamed;
  wherein the thermoplastic material of said rigid substrate layer is polyvinyl chloride and comprises an impact modifier, a stabilizer, a color pigment and a proportion of fillers between 30 and 70 percent by weight;

wherein said rigid substrate layer has a density between 1300 and 2000 kg/m$^3$;

wherein on at least one pair of opposite edges, said floor panel comprises coupling parts, said coupling parts allowing to effect a mechanical locking between two of such floor panels;

wherein said coupling parts are realized as a tongue and groove connection, the groove being bordered by an upper lip and a lower lip, and wherein the tongue and groove connection comprises locking elements;

wherein said upper lip and said lower lip are at least partially realized from said rigid substrate layer;

wherein said rigid substrate layer comprises plasticizers in an amount of less than 15 phr or does not comprise any plasticizer at all, and wherein said floor panel has a modulus of elasticity of at least 2000 N per square millimeter.

2. The floor panel of claim 1, wherein the rigid substrate layer comprises plasticizers in an amount of less than 10 phr or less than 5 phr.

3. The floor panel of claim 1, wherein the thermoplastic material of the rigid substrate layer comprises a proportion of fillers, which proportion is between 45 and 65 percent by weight.

4. The floor panel of claim 1, wherein said floor panel comprises a glass fiber layer.

5. The floor panel of claim 4, wherein the glass fiber layer relates to a glass fiber fleece.

6. The floor panel of claim 4, wherein the glass fiber layer adjoins to the rigid substrate layer.

7. The floor panel of claim 1, wherein said substrate further comprises a second rigid substrate layer of thermoplastic material in addition to the rigid substrate layer, and wherein said second rigid substrate layer of thermoplastic material is foamed.

8. The floor panel of claim 7, wherein said floor panel comprises a glass fiber layer, said glass fiber layer is adjacent to the rigid substrate layer and to the second rigid substrate layer, wherein the glass fiber layer is situated in between the rigid and the second rigid substrate layers.

9. The floor panel of claim 1, wherein the rigid substrate layer comprises one or more rigid substrate layers of thermoplastic material have an overall thickness of at least half of the overall thickness of the floor panel.

10. The floor panel of claim 1, further comprising a decor on the rigid substrate layer, wherein the decor relates to an imprinted or printed decor.

11. The floor panel of claim 10, wherein the floor panel comprises a wear and/or lacquer layer provided above the decor.

12. A floor panel comprising a substrate and a decor provided thereon, wherein said substrate comprises a rigid substrate layer of thermoplastic material, and wherein said rigid substrate layer of thermoplastic material is foamed and formed by extrusion of a composition consisting essentially of polyvinyl chloride, an impact modifier, a stabilizer, a color pigment and a proportion of inorganic or mineral filler between 30 and 70 percent by weight;

wherein said rigid substrate layer has a density between 1300 and 2000 kg/m$^3$;

wherein on at least one pair of opposite edges of the substrate, coupling parts are realized at least partially from the substrate, wherein said coupling parts are configured to, in a coupled condition of two such floor panels, effect a mechanical locking at said one pair of opposite edges, wherein said mechanical locking is operative in both a horizontal direction and a vertical direction, said coupling parts being realized as a tongue and groove connection, the groove being bordered by an upper and a lower lip, wherein said tongue and groove connection comprises locking elements in the form of a protrusion at a lower side of the tongue and a recess in an upper side of the lower lip, which, in a coupled condition, counteract the moving apart of the tongue and the groove in a horizontal direction, wherein said mechanical locking is realized by cooperating locking surfaces of said tongue and groove and locking elements;

wherein said upper lip and said lower lip are at least partially realized from said rigid substrate layer;

wherein a center line through said tongue is in said rigid substrate layer and wherein said groove comprises a most inwardly located point, said point being situated in said rigid substrate layer;

wherein zones in which the locking surfaces cooperate are situated at least partially in said rigid substrate layer;

wherein said rigid substrate layer comprises plasticizers in an amount of less than 15 phr or does not comprise any plasticizer at all, wherein a thickness of said rigid substrate layer is at least 65% of an overall thickness of said floor panel;

wherein said overall thickness of said floor panel is between 3 and 10 mm, the floor panel showing a modulus of elasticity or Young's modulus of at least 2000 N per square millimeter.

13. The floor panel according to claim 12, wherein the thickness of said rigid foamed substrate layer is between 2 and 6 mm.

14. The floor panel according to claim 13, wherein said decor is chosen from a list consisting of:
a decor printed directly on one or a plurality of base coats provided on said substrate;
a decor printed on a decor carrier, wherein said decor carrier is a thermoplastic film or a paper layer impregnated with a melamine resin; and
a decor being a veneer of wood or stone.

15. The floor panel according to claim 14, wherein said floor panel comprises a transparent or translucent wear and/or lacquer layer provided on said decor.

16. The floor panel according to claim 15, wherein said wear layer is a thermoplastic foil having a thickness between 350 and 750 micrometers, or a paper layer impregnated with melamine resin.

17. The floor panel according to claim 16, wherein a relief is formed in an upper side of said floor panel, wherein said relief reaches deeper than 100 microns, wherein said relief is provided by means of mechanical and/or chemical embossing.

18. The floor panel according to claim 17, wherein said relief extends into said substrate.

19. The floor panel according to claim 14, wherein said modulus of elasticity or Young's modulus is at least 3000 N per square millimeter.

20. The floor panel according to claim 19, wherein said modulus of elasticity or Young's modulus is at least 3500 N per square millimeter.

21. The floor panel according to claim 19, wherein said coupling parts allow bringing said two of such floor panels in said coupled condition by means of a turning movement as well as by means of a substantially horizontal snap movement.

22. The floor panel according to claim 21, wherein said lower lip is subjected to bending during said bringing said two of such floor panels in said coupled condition, wherein said lower lip is not broken.

\* \* \* \* \*